(12) United States Patent
Ganju et al.

(10) Patent No.: US 12,167,169 B1
(45) Date of Patent: Dec. 10, 2024

(54) SYSTEMS AND METHODS TO OPTIMIZE VIDEO STREAMING USING DIGITAL AVATARS

(71) Applicant: NVIDIA Corporation, Santa Clara, CA (US)

(72) Inventors: Siddha Ganju, Santa Clara, CA (US); Ruthie Lyle, Durham, NC (US); Naveen Kumar Rai, Sunnyvale, CA (US); Ronay Ak, Sarasota, FL (US); Andrew Russell, Weston, FL (US)

(73) Assignee: NVIDIA Corporation, Santa Clara, CA (US)

( * ) Notice: Subject to any disclaimer, the term of this patent is extended or adjusted under 35 U.S.C. 154(b) by 120 days.

(21) Appl. No.: 17/933,186

(22) Filed: Sep. 19, 2022

(51) Int. Cl.
| | |
|---|---|
| *H04N 7/15* | (2006.01) |
| *G06T 13/20* | (2011.01) |
| *G06T 13/40* | (2011.01) |
| *G06V 10/82* | (2022.01) |
| *G06V 40/20* | (2022.01) |
| *H04N 7/14* | (2006.01) |

(52) U.S. Cl.
CPC ........... *H04N 7/157* (2013.01); *G06T 13/205* (2013.01); *G06T 13/40* (2013.01); *G06V 10/82* (2022.01); *G06V 40/20* (2022.01); *H04N 7/147* (2013.01); *H04N 7/152* (2013.01); *G06V 2201/07* (2022.01)

(58) Field of Classification Search
CPC ........ H04N 7/157; H04N 7/147; H04N 7/152; H04N 7/15; H04N 21/4316; G06T 13/205; G06T 13/40; G06T 13/00; G06V 10/82; G06V 40/20; G06V 2201/07; H04L 15/10; H04L 12/1827; H04L 65/403; H04L 65/4038; H04L 65/1069; H04L 65/1089; H04L 65/93; H04M 3/567; A63F 2300/5553
See application file for complete search history.

(56) References Cited

U.S. PATENT DOCUMENTS

| | | | |
|---|---|---|---|
| 9,609,277 | B1 | 3/2017 | Chen |
| 10,863,179 | B1 | 12/2020 | Nandakumar |
| 11,580,737 | B1 | 2/2023 | Miller-Smith |
| 2010/0162313 | A1 | 6/2010 | Ruiz-Velasco |
| 2011/0279638 | A1* | 11/2011 | Periyannan ............ H04N 7/141 348/14.09 |
| 2017/0134828 | A1 | 5/2017 | Krishnamurthy |
| 2017/0330029 | A1 | 11/2017 | Turcot |
| 2018/0014022 | A1 | 1/2018 | Cho |
| 2018/0098030 | A1* | 4/2018 | Morabia ................ H04L 65/403 |
| 2018/0367757 | A1* | 12/2018 | Faulkner ................ H04N 21/47 |

(Continued)

OTHER PUBLICATIONS

Non-Final Office Action mailed Nov. 24, 2023 for U.S. Appl. No. 17/664,265.

(Continued)

*Primary Examiner* — Yogeshkumar Patel
(74) *Attorney, Agent, or Firm* — Plumsea Law Group, LLC

(57) ABSTRACT

A digital avatar system can process video streams and generate synthetic video with a digital avatar. The digital avatar provides the appearance of a participant from the video stream talking and one or more of performing various behaviors or actions consistent with the participant's behavior when they are live streamed. A digital avatar system can detect triggering events during a live stream and automatically switch to an avatar mode.

20 Claims, 16 Drawing Sheets

(56) References Cited

U.S. PATENT DOCUMENTS

| | | |
|---|---|---|
| 2019/0188479 A1 | 6/2019 | Balasubramanian |
| 2019/0230310 A1* | 7/2019 | Faulkner ................. H04N 7/15 |
| 2020/0074229 A1 | 3/2020 | AlShikh |
| 2020/0186749 A1 | 6/2020 | Al |
| 2021/0329306 A1 | 10/2021 | Liu et al. |
| 2022/0308742 A1 | 9/2022 | Ziv |
| 2022/0405316 A1 | 12/2022 | Raj |
| 2022/0408056 A1 | 12/2022 | Zheng |
| 2023/0062704 A1 | 3/2023 | Rösner |

OTHER PUBLICATIONS

Non-Final Office Action mailed Oct. 13, 2023 for U.S. Appl. No. 18/045,915.
Wang et al.; "One-Shot Free-View Neural Talking-Head Synthesis for Video Conferencing"; Available online at: <https://arxiv.org/pdf/2011.15126.pdf>; Apr. 2, 2021; 16 pages.
U.S. Appl. No. 17/382,027, filed Jul. 21, 2021.
U.S. Appl. No. 63/320,864, filed Mar. 17, 2022.
U.S. Appl. No. 17/664,265, filed May 20, 2022.
U.S. Appl. No. 18/049,446, filed Oct. 25, 2022.
U.S. Appl. No. 18/045,915, filed Oct. 12, 2022.
Non-Final Office Action mailed Feb. 15, 2024 for U.S. Appl. No. 18/049,446.
Final Office Action mailed Mar. 28, 2024 for U.S. Appl. No. 17/664,265.
Final Office Action mailed Apr. 5, 2024 for U.S. Appl. No. 18/045,915.

* cited by examiner

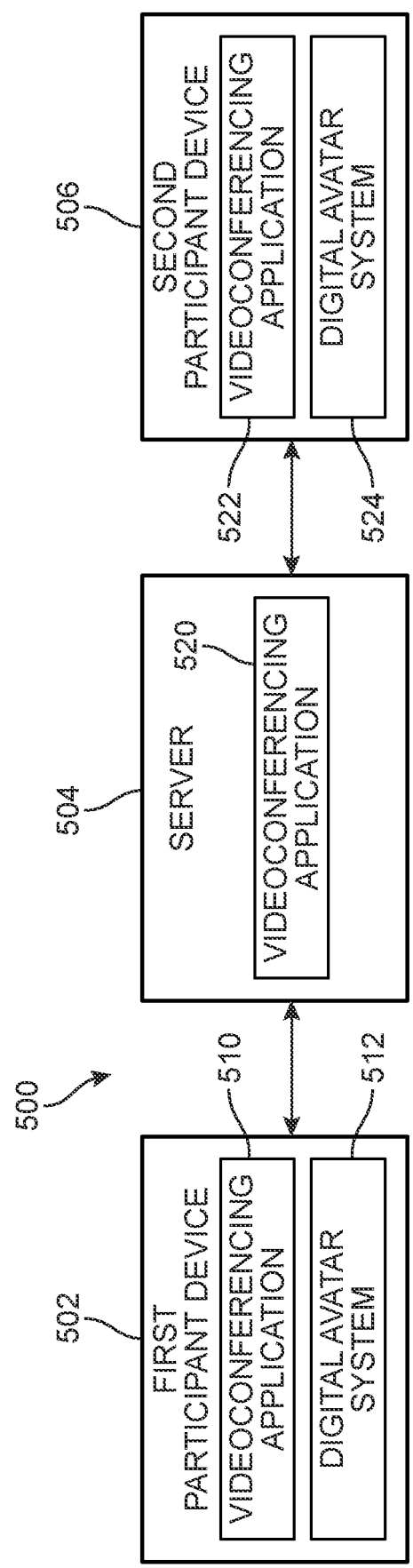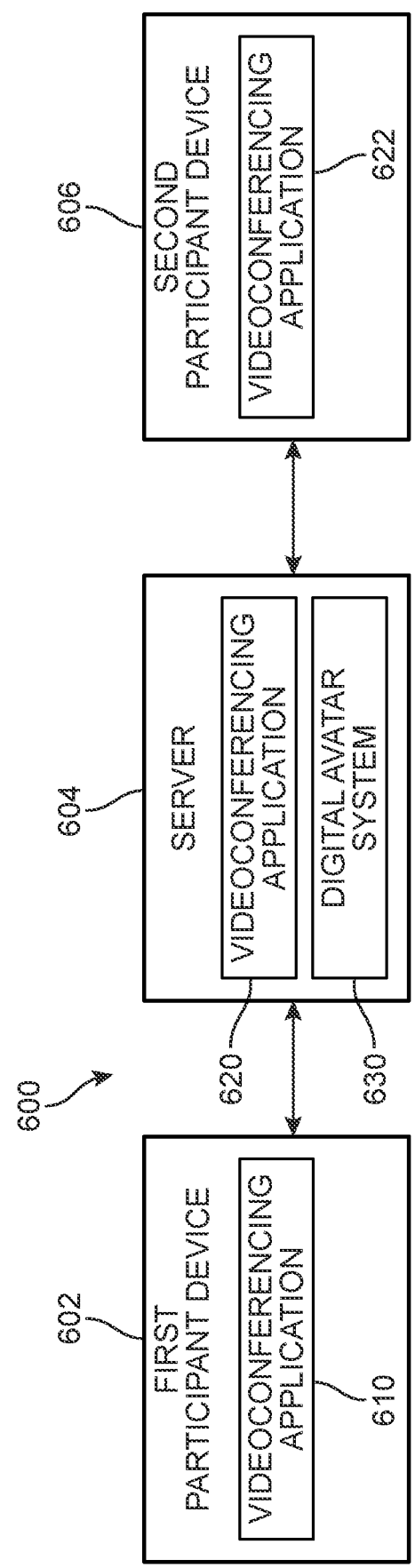

SYSTEMS AND METHODS TO OPTIMIZE VIDEO STREAMING USING DIGITAL AVATARS

TECHNICAL FIELD

The present disclosure generally relates to video streaming data, and in particular, to optimizing video streaming data based at least in part on generated synthetic video data, such as digital avatar videos.

BACKGROUND

Videoconferencing and related streaming applications are becoming ubiquitous as the technology becomes robust enough to provide similar experiences to in-person meetings. More generally, video streaming is becoming a more popular way to interface with others, whether it is via videoconferencing, streaming services or other video-based applications.

Problems can arise in videoconferencing due to the various conditions present in environments that participants may find themselves in. For example, participants calling in from home may face constant interruptions from family members, delivery persons, pets, or other sources. These interruptions can distract not only the participant, but other participants on the videoconferencing call.

In addition, videoconferencing can be a high bandwidth activity that requires significant amounts of data to be transferred over one or more networks. When participants are calling from remote locations, bandwidth may be limited due to various constraints including other users requiring bandwidth simultaneously. This may cause issues such as lagging for one or more participants in the videoconferencing session.

There is a need in the art for a system and method that addresses the shortcomings discussed above.

SUMMARY

In one aspect, the techniques described herein relate to methods and systems for automatically replacing live video streams of participants in a video streaming session with video streams of corresponding digital avatars. These digital avatars are generated on-the-fly and may be sufficiently realistic so that other participants may not realize they are looking at an avatar rather than a live feed. The methods and systems provide ways of detecting triggering events and generating and displaying the digital avatars in response to those triggering events. Moreover, the methods and systems can receive audio and/or text from users. The digital avatars may be animated to appear as though they are speaking words from the received audio or text. In some cases, the digital avatars are constructed using images of the participants.

The process of capturing and processing information (including images, audio, and/or text) can be performed on the participants' own machines, or at a remote device, such as a cloud-computing system.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

FIG. 5 is a schematic view of one exemplary architecture for a videoconferencing system using digital avatars, according to an embodiment;

FIG. 6 is a schematic view of another exemplary architecture for a videoconferencing system using digital avatars, according to another embodiment;

DESCRIPTION OF THE EMBODIMENTS

Figure 1:
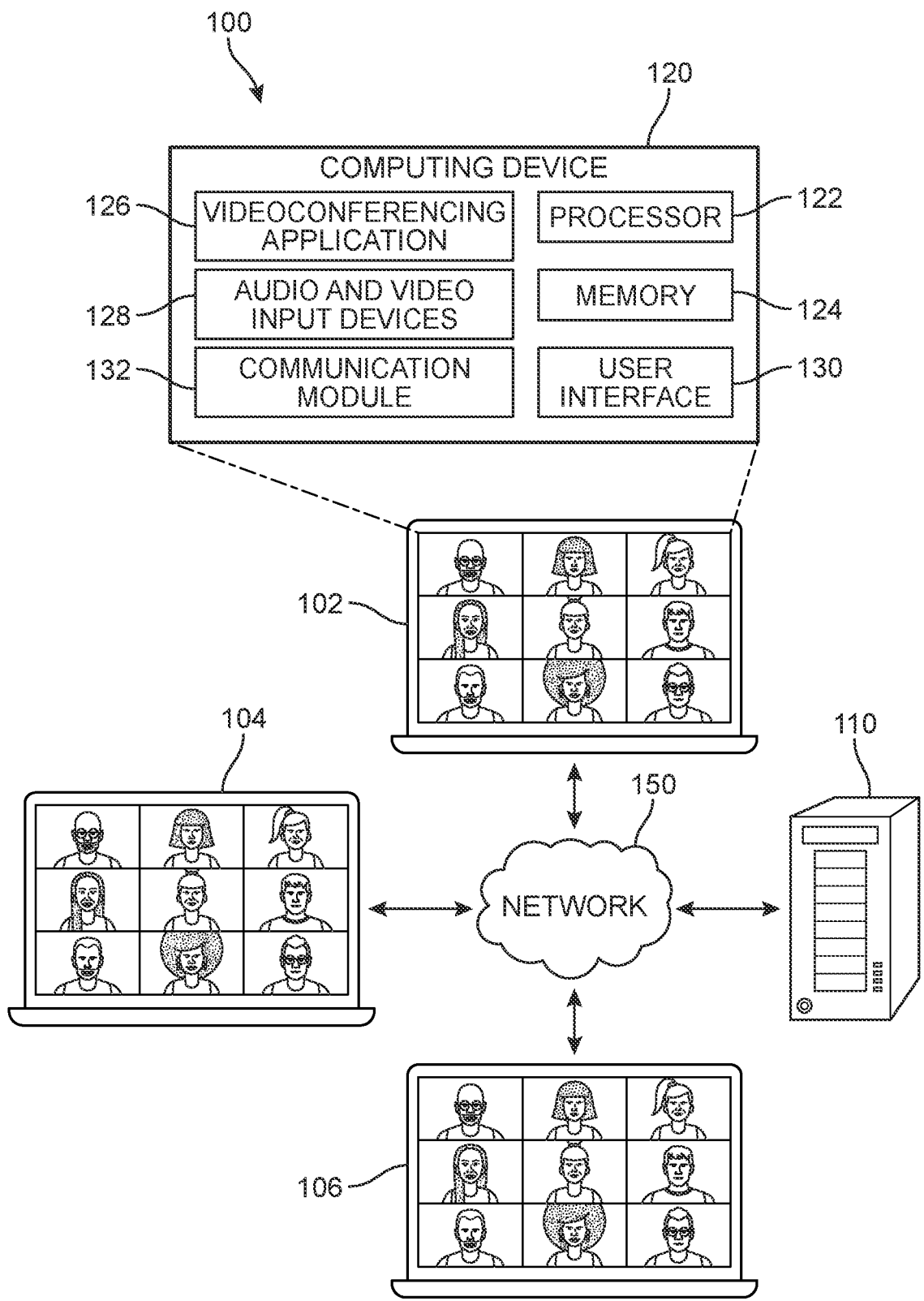
FIG. 1 is a schematic view of a videoconferencing system including multiple participant devices and a remote server, according to an embodiment.

The embodiments may use any of the various systems and methods for synthesizing video that are disclosed in Liu et al., U.S. patent application Ser. No. 17/382,027, titled "Synthesizing Video from Audio Using One or More Neural Networks" which is hereby incorporated by reference in its entirety and referred to as the Synthesizing Video Application. The embodiments may use any of the various systems and methods for synthesizing video that are disclosed Nagano et al., U.S. Patent Application No. 63/320,864 titled "3D Digital Avatar Generation from a Single or a Few Portrait Images", which is hereby incorporated by reference in its entirety.

The embodiments provide systems and methods of optimizing video streaming applications by replacing live video feeds of one or more participants in a video streaming application with corresponding digital avatars videos. A digital avatar system is integrated into a video streaming application (such as a videoconferencing application) at one or more devices. The digital avatar system can monitor live (or any captured/recorded) video streams, as well as information from external sources, in order to detect triggering events. When a triggering event is detected, the system can switch from a "live mode," comprised of video of a participant that has been captured by a perception sensor, such as a camera, RADAR sensor, LiDAR, infrared camera, ultrasonic) to an "avatar mode", comprised of synthetically generated video including a digital avatar of the participant. The digital avatar can be animated so that the mouth movements of the digital avatar are synchronized with any audio from the participant (or with synthesized speech generated using text that is provided by the participant). The digital avatar can also be animated to simulate various gestures, facial expressions, or other movements that the participant (or people more generally) might make. In some embodiments, these may include movements of arms, hands, legs or other parts of the body. Thus, in some cases, the digital avatar may provide a realistic dynamic image of the participant that is indistinguishable from recorded video of the participant.

The digital avatar system can optimize video streaming, including videoconferencing, performance. In some cases, when low bandwidth is detected for one or more of the users, the digital avatar system can be activated. By generating a digital avatar of one or more participants at each participant's computer, full video streams do not need to be transferred over one or more networks, thereby optimizing operation of the videoconferencing system for low bandwidth environments.

The digital avatar system also allows images of participants to be rendered in video streams according to various rules, constraints, or user preferences. In particular, aspects of a participant's appearance can be automatically modified so that the digital avatar of the participant can be shown with different clothing, different accessories, different colored hair, with or without makeup or facial hair, as well as providing other suitable modifications to their appearance. Additionally, various behaviors can be injected so that the digital avatar can perform facial expressions, gestures, and various hand, head, or whole body movements in a way that realistically simulates the behaviors of the associated participant.

Various terms are defined here for clarity.

As used herein, the term "participant" may refer to any person who may be participating in a videoconferencing session, or who is otherwise part of a video stream. A videoconferencing session may generally have multiple different participants, each of whose video streams are displayed (or presented) within a videoconferencing application on the participants' local devices. The term "user" may also be used to refer to participants in a videoconferencing session.

As used herein, the term "digital avatar" refers to a digital representation of a participant (or user). In the exemplary embodiments, a digital avatar may have a sufficiently similar appearance to an image of a participant that may be captured by a camera. In many implementations of the proposed methods and systems, a digital avatar may appear indistinguishable from an image of a participant that has been captured by a camera. In other embodiments, a digital avatar may not have the likeness of the associated participant or user. For example, in some cases, a digital avatar could have a cartoonish appearance.

As used herein, the term "animated" refers a sequence of images that gives the appearance of movement. In the context of digital avatars for videoconferencing applications, animated avatars are avatars that appear to move. Moreover, animated avatars of the embodiments may move in a sufficiently realistic manner, such that their facial expressions, gestures, mouth movements during speech, poses, and other bodily movements are sufficiently realistic and, in some cases, indistinguishable from recorded facial expressions, gestures, and general movements of a participant.

The embodiments may refer to different kinds of "video". A video may be any sequence of images that are meant to be played back in sequence. Types of video include "captured video" (or "recorded video") and "synthetic video". Captured video refers to video that has been captured (or recorded) using a perception sensor, such as a camera. In some cases, the term "live video" may also be used to refer to video that has been captured/recorded and is being streamed in real time. In some cases, the term "raw video" could also be used to refer to recorded video. However, it may be appreciated that captured video could still be processed in some way, and may not necessarily comprise raw, unprocessed, images. By contrast with captured video, synthetic video is comprised of images that have been synthetically created. Examples of synthetically created images include images that may be output from various kinds of generative machine learning systems.

The term "video conferencing" as used herein refers broadly to any use of streaming video to facilitate communication between two or more users. Video conferencing can utilize video conferencing platforms, such as Microsoft Teams, Zoom, and Skype, as well as video calling applications such as Facetime. As used herein, the term video conferencing is not intended to be limited to particular platforms or uses of streaming video (and audio) to facilitate communication.

The embodiments provide systems and methods for generating digital avatars that can be presented as part of video streaming. In one embodiment, video streaming comprises video conferencing or teleconferencing. Video streaming comprises, in an embodiment, video game streaming and video game streaming services. In one embodiment, video streaming comprises digital satellite video streaming, such as digital satellite television streaming. In another embodiment video streaming comprises broadcast video streaming. Video streaming, in an embodiment, comprises internet video streaming. In one embodiment, video streaming comprises digital video broadcasting. Video streaming, in an embodiment, comprises any Advanced Television Systems Committee (ATSC) approved television or other video broadcast technique, such as cable or broadcast television. In another embodiment video streaming comprises any ATSC mobile/handheld (ATSC-M/H) video broadcast method. In one embodiment, video streaming comprises closed circuit television streaming and other closed circuit digital video capture or broadcast. In another embodiment video streaming comprises video capture and encoding performed by personal digital cameras, such as DSLR cameras, to store, encode, and transmit digital video data. In one embodiment, the proposed embodiments are usable for any video streaming and/or video capture application described above or further described herein.

In some cases, video streaming information includes image information that can be used to playback videos at another device, as well as audio streaming information. In other cases, audio streaming information could be sent separately from the video streaming information.

Some embodiments may use or include artificial intelligence techniques. These artificial intelligence techniques may include Natural Language Processing (NLP). Any kind of NLP may be used. In some cases, Large Language Models (LLMs) may be used. Some LLMs may include a very large number of parameters, in some cases LLMs may use hundreds of billions or trillions of parameters. To accommodate this scale of computing, these LLMs may be executed on custom, proprietary machine learning processors or chips. However, in other embodiments, LLMs may be executed using commercially available hardware. A non-limiting example of an LLM running on proprietary hardware is the Bidirectional Encoder Representations from Transformers (BERT)-Large language model that runs on 1,472 NVIDIA V100 GPUs. Another non-limiting example of an LLM running on proprietary hardware is Google Research's Pathways Language Model (PaLM) that runs on a cluster of 6144 proprietary TPU chips. Other examples of LLMs include Gopher by DeepMind and OpenAI's GPT-3 (Generative Pre-Trained Transformer-3). The preparation and the amount of training provided to the LLMs prior to use may vary. In some cases, very little training may be provided to the LLM. In some embodiments, the LLM is trained with zero-shot or few-shot. In other embodiments, the initial training includes fine tuning techniques.

FIG. 1 is a schematic view of an architecture 100 for providing video conferencing for multiple participants. Videoconferencing is enabled through the use of participant devices, one or more networks, and one or more servers. In the example of FIG. 1, architecture 100 includes a first participant device 102, a second participant device 104, and a third participant device 106. The participant devices communicate over network 150 (such as the Internet). In some cases, the devices may communicate over multiple kinds of interconnected networks including combinations of local area networks (such as Wi-Fi networks) and wide area networks (such as the Internet). In some cases, participant devices may communicate with one or more applications running on a remote server 110. In other cases, participant devices could communicate directly (that is, in a peer-to-peer network).

As shown in FIG. 1, each participant device is configured with a screen or display for showing video feeds of other participants, as well as speakers (not shown) for playing audio that accompanies the video feeds. In the example of FIG. 1, each participant device shows nine concurrent video streams of participants who are participating in the same video conferencing session. There may therefore be other participant devices connected to the videoconferencing session that are not shown in FIG. 1.

Each participant device may also be configured with suitable hardware and software. For clarity, FIG. 1 shows some exemplary components 120 for participant device 102 (also referred to as a computing device), however it may be appreciated that each of the other participant devices connected to the current videoconferencing session could also include similar components.

In different embodiments, participant device 102 can refer to a computing system or any other computing device comprising one or more video and/or audio input devices 128. In one embodiment, a participant device generates or captures video (and/or audio) data, for example during interaction with a videoconferencing application 126 that runs on participant device 102. In one embodiment, original video content captured at participant device 102 is data comprising information usable to reconstruct or regenerate one or more images or video frames, where said information is generated, in part, by one or more input devices 128.

In some embodiments, input devices 128 can comprise one or more hardware components to capture image and video information. In one embodiment, an input device is or includes a software video capture program, such as a screen capture program or video conferencing program. In some cases, an input device includes a video game streaming software program. In another example, an input device includes any other software or hardware component to capture, generate, or receive video data. In another example, an input device is a camera, while in other embodiments, the input device is any other type of device further described herein to capture image and video information.

Input devices 128 may also comprise any suitable devices for capturing audio information. In some embodiments, input devices 128 include microphones.

In different embodiments, participant device 102 as well as other participant devices (e.g., participant device 104 and participant device 106) can refer to a variety of computing device types, such as but not limited to a desktop computer, laptop, notebook, tablet, smartphone, autonomous vehicle and smartwatch. Each device can include an electronics unit comprising a plurality of different components, such as a user interface component (e.g., a touchscreen display, keyboard, mouse, microphone, speaker, etc.), a user interface module, a processor 122, and/or a communication module 132.

The device may include a system including one or more processors 122 and memory 124. Memory 124 may comprise a non-transitory computer readable medium. Instructions stored within memory 124 may be executed by the one or more processors 122. The device may be configured to receive and analyze data from various input sensors associated with the device or data that is communicated from external components or devices connected to the device.

A communication module 132 may allow the device to communicate wirelessly. In this case, the communication module is illustrated as enabling access to a wireless network 150; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In one embodiment, the service is configured to be available completely offline, such that all features and components described for the application reside locally on the user's computing device.

A user interface 130 may facilitate interactions between a participant/user and one or more applications, including a videoconferencing application. The user interface may include one or more graphical user interfaces (GUIs) for interacting with the device's operating system, as well as specific GUIs that may be integrated into the videoconferencing application itself. These interfaces may allow users to initiate videoconferencing calls/sessions, enter preferences, and provide manual controls of one or more applications, as discussed below.

Figure 2:
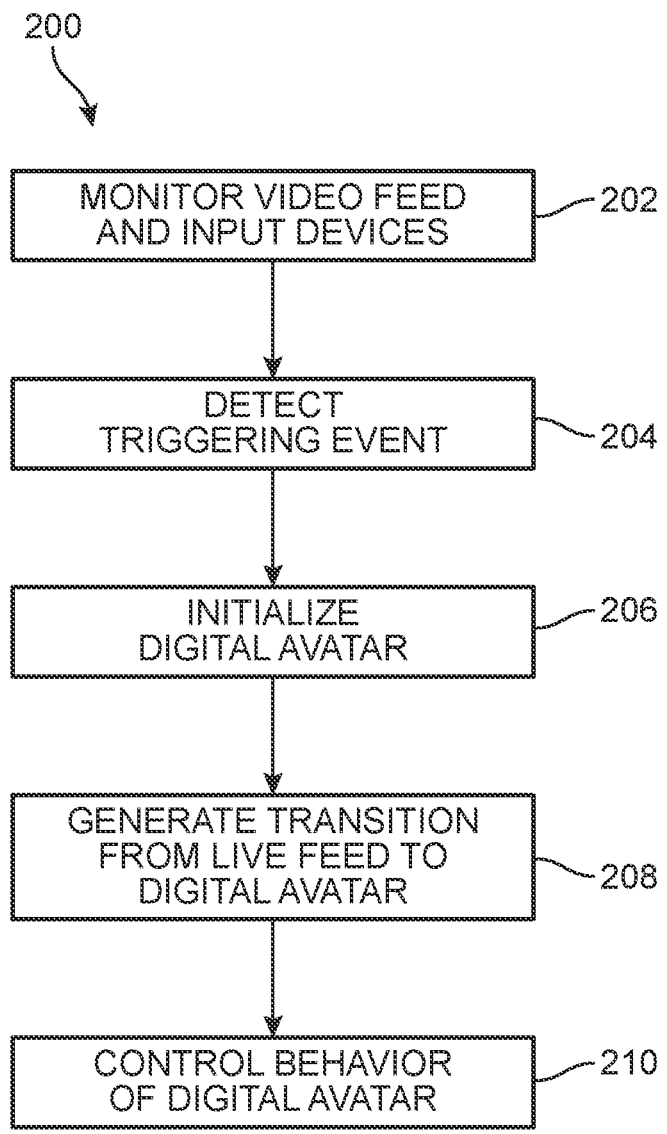
FIG. 2 is a schematic view of a method for generating and controlling a digital avatar as part of a video streaming activity, according to an embodiment.

FIG. 2 is a schematic view of a process 200 for generating and controlling a digital avatar during a videoconferencing session. It may be appreciated that one or more of the following operations could be performed by one or more participant devices and/or one or more remote servers, as described in further detail below. For clarity, the term "digital avatar system" is used to refer to a system that performs one or more of these operations. In some cases, not all components of a digital avatar system need reside on the same device. Moreover, while the process may be characterized by one or more operations, the embodiments are not necessarily limited to a particular ordering of operations, and in some embodiments the order or sequence of some operations could be changed.

Starting in operation 202, a digital avatar system may monitor one or more participants' video feeds. In addition, the digital avatar system can also monitor information from other input devices associated with any of the videoconferencing participants and their respective devices. In this context, input devices need not be limited to peripheral computing devices such as microphones and keyboards, but could also include any external devices that provide input to a digital avatar system. These could include IoT devices, for example.

Next, in operation 204, the digital avatar system can detect a triggering event. As used herein, the term "triggering event" refers to an event that causes a system to change its operation in some way. Examples of triggering events can include, but are not limited to: fluctuating bandwidth throughput, low ambient light conditions, the presence of other persons or pets, the detection of particular participant motions or actions, low bandwidth messages, low power messages, messages from IoT devices, and manual commands from any participants/users of the system including third parties associated with geofenced physical locations. In some embodiments, triggering events could be determined by a Large Language Model, as discussed below.

Upon detecting a triggering event, the digital avatar system may automatically initialize a digital avatar for one (or more) of the participants in the videoconferencing session, as in operation 206. Initializing the digital avatar can include one or more operations. In some embodiments, initialization includes retrieving a suitable image of a participant, and generating an initialized avatar image. As discussed in further detail below, initializing the digital avatar can include changing features of the digital avatar, such as its hair color, eye color, the presence of makeup or of facial hair, as well as other features.

After operation 206, the digital avatar system may generate a transition between the live feed seen by other participants in their instances of the videoconferencing application, and the digital avatar of at least one participant, in operation 208. In some cases, the system can perform this transition in a way that minimizes any discrepancies between the last few images of the live video feed and the appearance of the digital avatar.

In operation 210, the digital avatar system may continuously control the behavior of the digital avatar, after it has been initialized. Controlling the behavior of the digital avatar may comprise animating mouth movements, facial expressions, gestures, body movements, poses, position, orientation, and/or other aspects of the digital avatar that can be seen by other participants viewing the digital avatar.

Figure 3A:
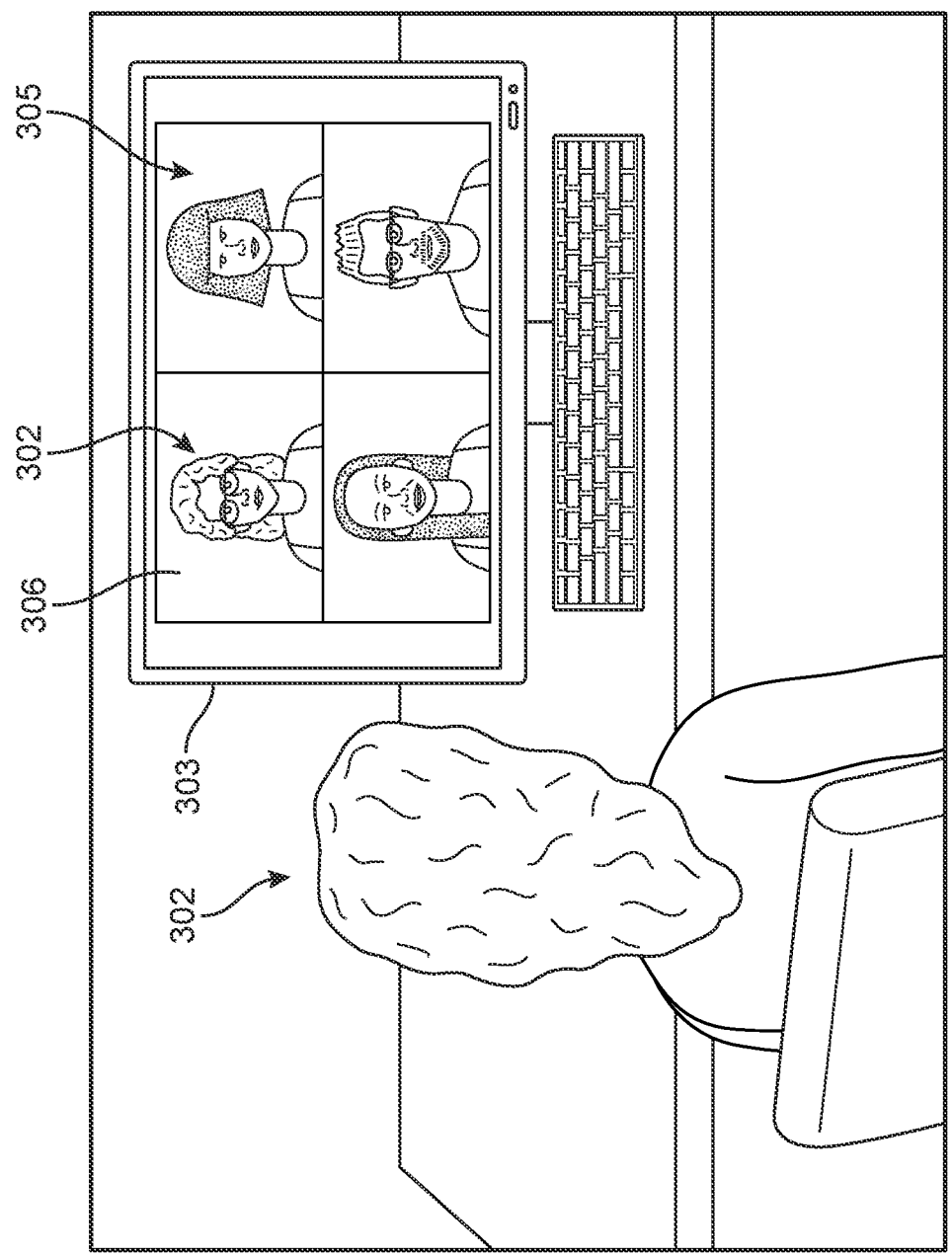
FIGS. 3A-C are schematic views of a situation where a digital avatar may be activated when a participant is distracted and looking away from a camera, according to an embodiment.
Figure 3B:
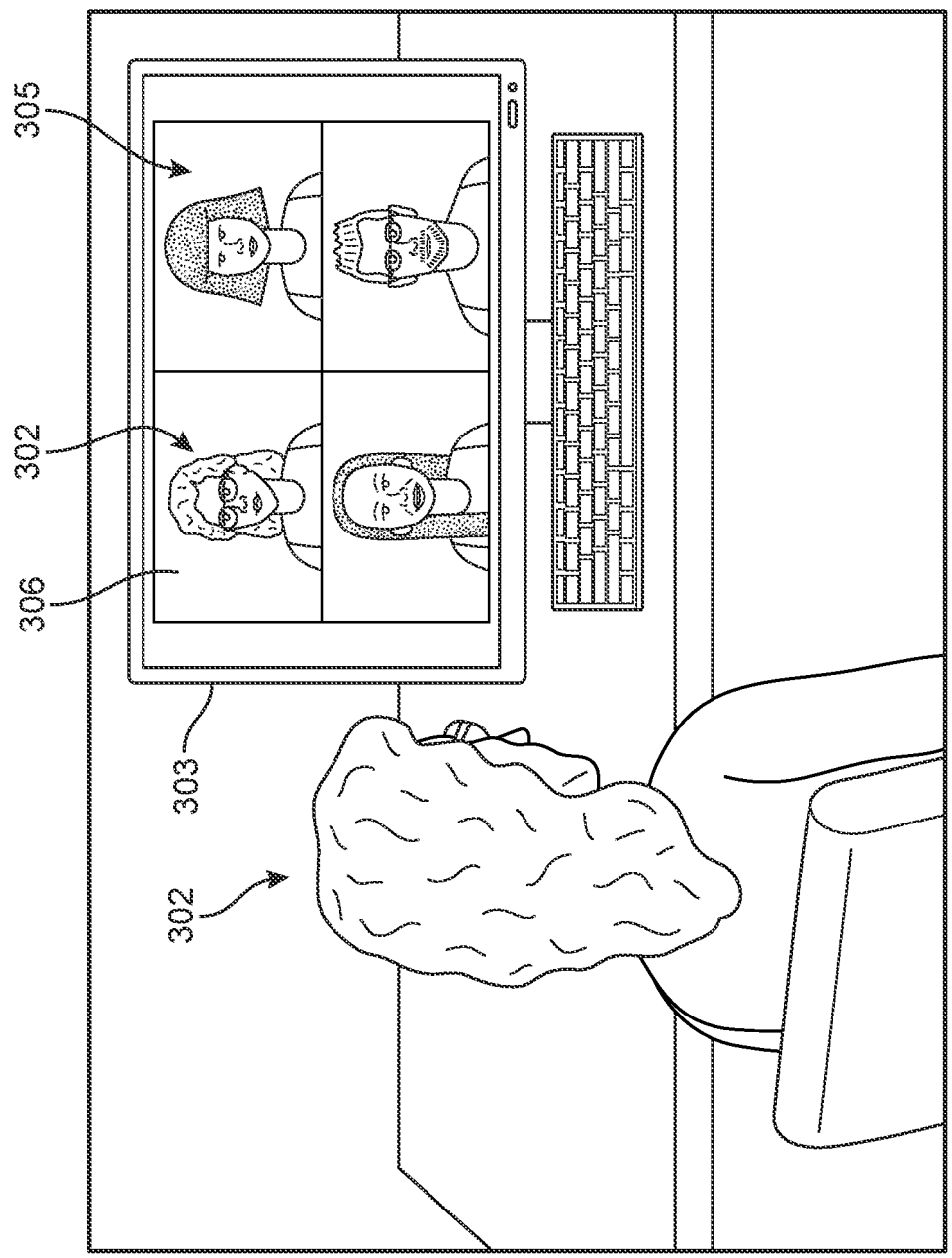
Figure 3C:
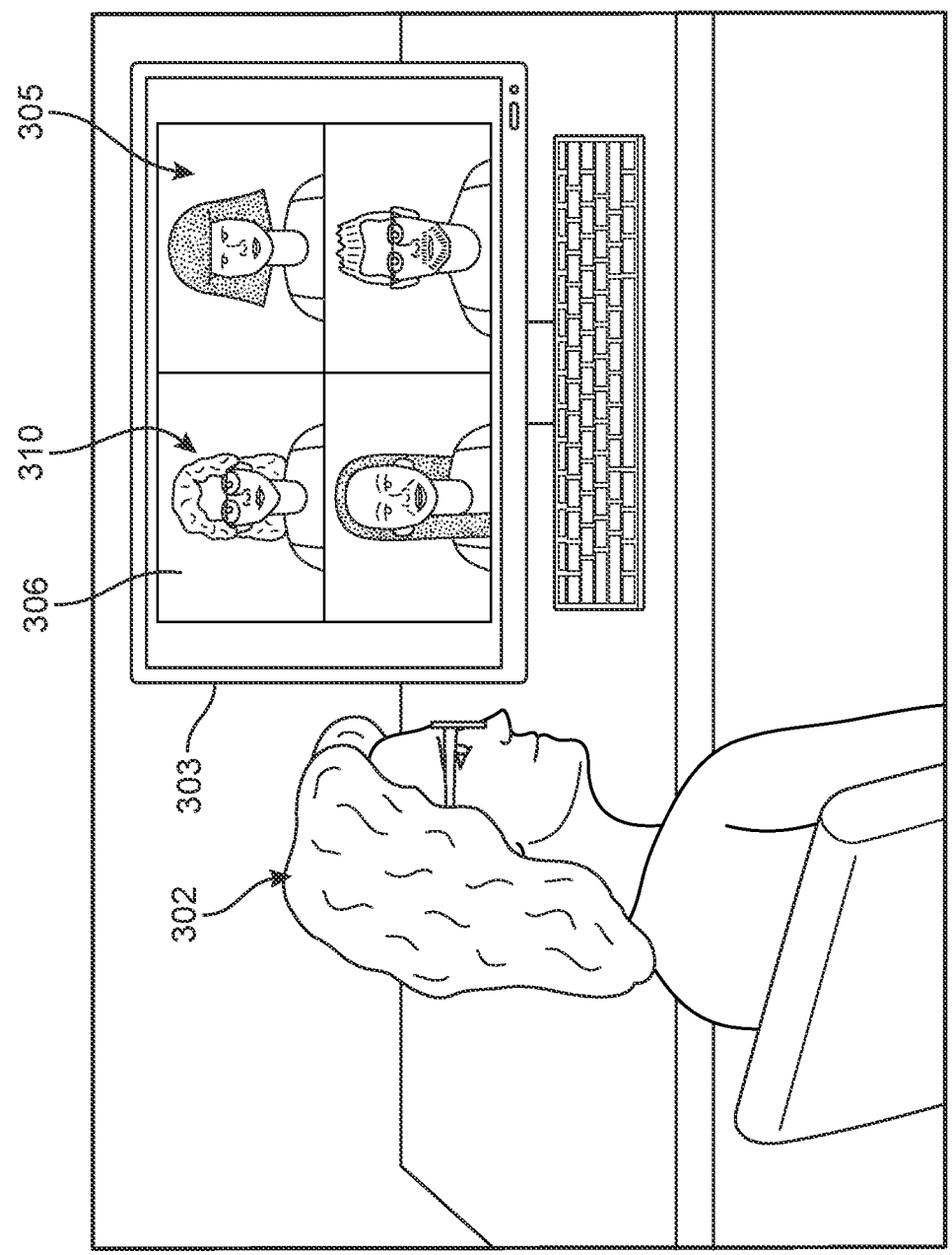

At some later time, the digital avatar system may detect a triggering event to deactivate the digital avatar. This could occur after a predetermined period, or in response to detecting that a participant is ready to be visible within the videoconferencing session or when the trigger event that caused the system to behave in a certain way has been alleviated. That is, the digital avatar system can be configured to dynamically switch the video stream of a participant between a "live mode", in which the captured video of the participant is shown on their video stream, and an "avatar mode", in which their video stream shows an animated digital avatar (which may, nevertheless, appear as though it is a live feed of the participant) and vice versa. This transition from the live mode to the avatar mode can be done in response to one or more triggers detected by the system. Once in the avatar mode, the system can then switch back to the live mode in response to suitable triggers. FIGS. 3A-3C are schematic views of a scenario where a digital avatar is deployed to facilitate a smooth videoconferencing experience. In FIG. 3A, a participant 302 is sitting at a computer 303 and participating in a videoconference with other participants whose video streams 305 are displayed on a screen of computer 303. The video stream showing participant 302 is displayed in videoconferencing window 306. As seen in FIG. 3A, the video stream shows a live view of participant 302 as she is looking at a camera (not shown) of computer 303.

If participant 302 turns her head slightly, as in FIG. 3B, the live view of participant 302 is still streamed to participants in the video conference, as shown in window 306. That is, other participants can see participant 302 turning her head slightly within her video feed. However, if participant 302 turns away from the camera completely (for example, to speak to someone in another room), the system may automatically identify this as a trigger for activating a digital avatar of the participant (to avoid allowing other participants to see this distraction). As seen in FIG. 3C, as participant 302 turns away from the camera, a digital avatar 310 is activated and displayed as part of the streaming video in window 306. In this situation, digital avatar 310 is displayed in a way that makes it appear to the other participants as though participant 302 is still facing the camera and paying attention to whomever is speaking in the videoconference. In some cases, digital avatar 310 may be rendered and animated in a suitably realistic manner so that the other participants cannot distinguish between this synthetic video feed and the live video feed.

As discussed in further detail below, a digital avatar may not simply comprise a static image of a participant. Instead, a digital avatar may comprise a dynamic representation of the participant that can be animated according to the participant's usual gestures and mannerisms, and such that the avatar's mouth movements match (are synchronized with) any speech from the participant. In particular, the digital avatar may be animated in a way that makes the synthetic video stream seem indistinguishable from the live video stream. In some cases, the transition between a live feed mode and an avatar mode may be so seamless that other participants cannot tell when they are looking at the digital avatar as opposed to a live feed of the participant. Moreover, because the digital avatar system can automatically animate the digital avatar's mouth movements to match any ongoing speech from the participant, the participant can continue speaking to other participants even as they may be looking away from the screen, standing up, or even walking away from their computer. For other participants in the videoconferencing session, they will still see a video of the participant sitting at their computer and speaking.

For purposes of clarity, the term "digital avatar video feed" or "digital avatar video" may be used to refer to the sequence of images of the digital avatar that are displayed within a video streaming application. Depending on the system architecture, the digital avatar video feed may be generated at the same device as the user whose avatar is being shown. Alternatively, the digital avatar video feed could be generated at another device, such as another user device, or device in the cloud, and then sent to the device(s) on which the feed is displayed. By contrast with captured or raw video of a participant or user, a digital avatar video feed is a synthetic video feed comprised of synthetically generated images of a digital avatar.

Figure 4A:
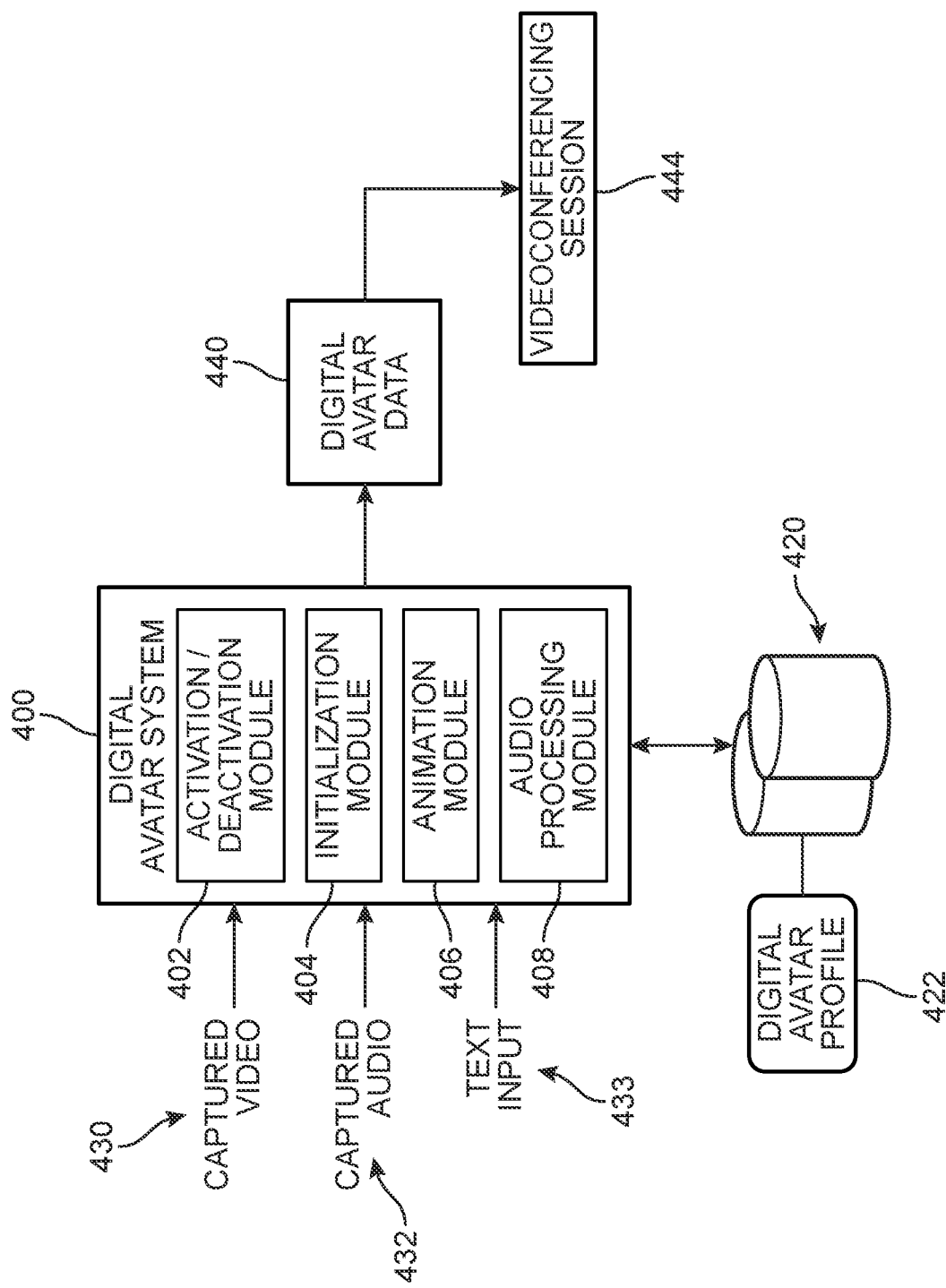
FIG. 4A is a schematic view of a digital avatar system and related components, according to an embodiment.

FIG. 4A is a schematic view of one possible configuration of a digital avatar system 400. Digital avatar system 400 may comprise various components and/or modules that are used to activate/deactivate, initialize, and animate a digital avatar for a participant/user. Specifically, digital avatar system 400 can further comprise an activation/deactivation module 402 (or simply "activation module 402"), an initialization module 404, and an animation module 406. Activation module 402 may detect, during a video streaming session, that a digital avatar is needed (or no longer needed in the case of deactivation). That is, activation module 402 monitors various kinds of inputs and detects triggering events. Activation module 402 then alerts other systems to create and animate a digital avatar. Initialization module 404 may construct an initialized avatar image in response to instructions from activation module 402. Animation module 406 takes the initialized avatar image as input and animates the avatar image to create a dynamic digital avatar that can be displayed within a participant's streaming video feed.

A digital avatar system 400 can also include an audio processing module 408. Audio processing module 408 can include provisions for filtering, or otherwise editing, captured audio 432. Audio processing module 408 can deliver any captured audio to animation module 406, which is used in generating the digital avatar, as described in further detail below.

To facilitate processing audio information, digital avatar system 400 can also include or have access natural language processor (NLP), which may be incorporated into audio processing module 408. For example, embodiments of the proposed systems and methods may make use of various techniques and technologies, such as but not limited to speech processing, speech synthesis, and Natural Language Processing (NLP) systems.

In some embodiments, text input 433 could be provided to digital avatar system 400, for example, if a user is unable to speak or must turn his or her microphone off. In this situation, audio processing module 408 can, using text-to-speech algorithms associated with its NLP systems, generate audible speech from the user's text.

In some embodiments, audio processing module 408 could also convert, using NLP systems, speech to text. The text could then be passed and used by other modules, such as animation module 408.

Digital avatar system 400 may make use of various kinds of stored data, which could be stored in databases 420. For example, digital avatar system 400 could store and make use of a digital avatar profile 422 ("profile 422"). In some cases, profile 422 comprises information that may be used to construct a digital avatar for a particular participant.

Examples of information that could be stored in a digital avatar profile include, but are not limited to, static images of a participant, video clips of a participant, information characterizing participant behaviors (such as gestures and mannerisms), appearance preferences, and other suitable information.

In some embodiments where a digital avatar system is used to construct the digital avatar of other participants in a videoconferencing session, database 420 could also store digital avatar profiles for each of the other participants so that this information does not need to be passed between participant devices at the start of each videoconferencing session.

As seen in FIG. 4A, digital avatar system 400 receives captured video 430 and captured audio 432 as inputs. Optionally, digital avatar system 400 may also receive text input 433. Captured video 430 and captured audio 432 may be received from any suitable audio and video input devices (such as audio and video input devices 128 of FIG. 1). Captured video 430 and captured audio 432 may be processed by the various modules shown in FIG. 4A and described above. Digital avatar system 400 outputs digital avatar video data 440 (or simply "digital avatar data 440"). Digital avatar data 440 can include a sequence of images, as well as audio information, which comprise the digital avatar synthetic feed that can be viewed by participants in the videoconferencing session 444 via a suitable videoconferencing application (or other suitable video streaming application).

It may be appreciated that in some cases, the digital avatar video feed associated with digital avatar data 440 may differ significantly from captured video 430. As an example, in the situation shown in FIG. 3C, a live view (that is, captured or recorded view) of participant 302 would have shown the participant facing away from the camera. However, using a digital avatar system, the displayed digital avatar video feed (within window 306) shows digital avatar 310 seated in front of, and looking directly at, a camera within the participant's computing device.

Figure 4B:
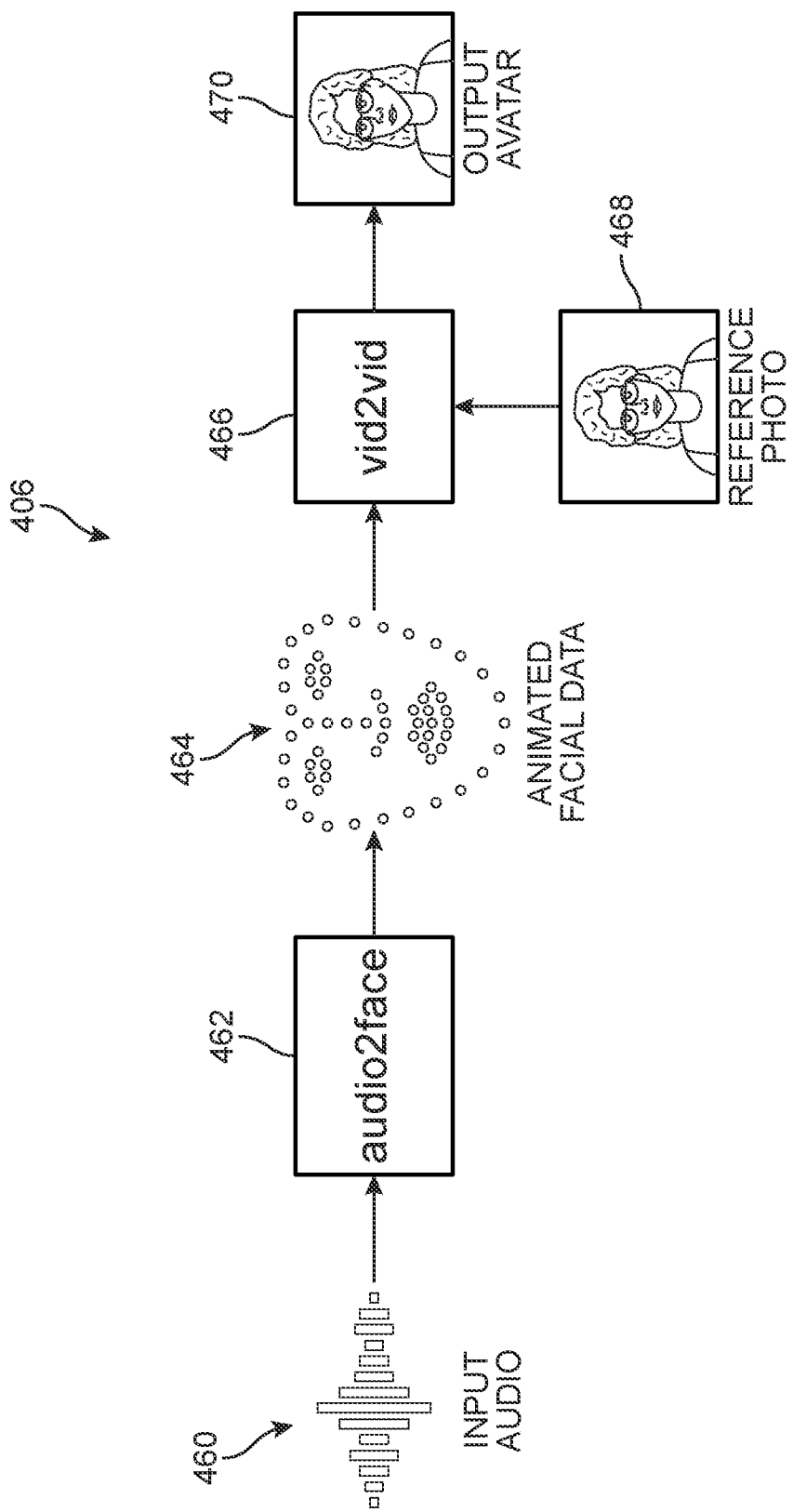
FIG. 4B is a schematic view of some components of an exemplary animation module, according to an embodiment.

FIG. 4B is a schematic view of an exemplary architecture for animation module 406, according to an embodiment. This architecture comprises components that are described in further detail in the Synthesizing Video Application, which was discussed above.

One example of a suitable animating technology is known as the generative adversarial network (GAN) framework. The GAN framework has emerged as a powerful tool for various image and video synthesis tasks, allowing the synthesis of visual content in an unconditional or input-conditional manner. It has enabled the generation of high-resolution photorealistic images and videos, a task that was challenging or impossible with prior methods. It has also led to the creation of many new applications in content creation.

The proposed systems and methods take advantage of improvements in video synthesis to provide realistic animations of a digital avatar. As a general matter, video synthesis focuses on generating video content that preserves the temporal consistency of the output videos. This is usually achieved by using a temporal discriminator, flow-warping loss on neighboring frames, smoothing the inputs before processing, or a post-processing operation. Conditional video synthesis generates videos conditioning on input content (e.g., future frame prediction, high-level representation input video, etc.).

Some recently designed GAN frameworks only need a single 2D image of the target person (in this case, a 'participant' in a video stream) and can synthesize talking videos of this person given arbitrary motions. These motions are represented using either facial landmarks or key points learned without supervision. Since the input is only a 2D image, many methods rely on warping the input or its extracted features and then fill in the un-occluded areas to refine the results. To synthesize the target identity, features are extracted from the source images and information is injected into the generator. Since these methods require only an image as input, they become particularly powerful and can be used in even more cases. Similarly, pose transfer techniques aim at transferring the body pose of one person to another person. It can be seen as the partial or whole body counterpart of face reenactment. Recent works have shown their capability to generate high quality and high-resolution videos for challenging poses.

More specifically, a pure neural rendering approach has been developed by which a talking-head video using a deep network in the one-shot setting is rendered without using a graphics model of the 3D human head. This type of approach can in some cases directly synthesize accessories present in the source image, including eyeglasses, hats, and scarves, without their 3D models. In different embodiments, the encoded behavior of video participants is reconstructed via a local free-view video synthesis model where one can freely change the viewpoint of the talking-head within a large neighborhood of the original viewpoint. The reconstruction model achieves this capability by representing a video using a novel 3D key point representation, where person-specific and motion-related information is decomposed. Both the key points and their decomposition are learned without supervision. Some examples of these techniques are described in further detail in U.S. Patent Publication No. 2021/0329306 published on Oct. 21, 2021 and titled "Video Compression using Neural Networks" to Ming-Yu Liu, et al. (hereinafter the Liu application), the disclosure of which is incorporated by reference in its entirety. The embodiments described herein apply these video synthesis techniques in order to facilitate the animation of digital avatars in a sufficiently realistic manner so that other participants in a videoconferencing call may not be able to distinguish the avatar from a live feed of the participant.

Referring to FIG. 4, in this exemplary architecture, input audio 460 is passed to a first neural network 462. In some cases, first neural network 462 ("audio2face") receives audio input and outputs animated facial data 464. The animated facial data 464 encodes facial expressions (including mouth movements) for the audio from which it is generated. At this point in the process, animated facial data 464 may not be representative of a particular face, but rather of a general model face. Moreover, because input audio 460 comprises a time series, animated facial data 464 may also be understood to comprise an associated sequence of facial data, such that each data element in the sequence corresponds to a generalized configuration for a face (that is, a face with a particular facial expression, mouth configuration, etc.).

Next, animated facial data 464 is passed to a second neural network 466 ("vid2vid"). Second neural network 466 also receives a reference photo 468 of the user whose avatar is to be created/animated. As discussed in further detail below, this reference photo could be retrieved from local storage, or could be grabbed from a recent live video stream that was passed to the device running the digital avatar system.

Using animated facial data 464 and reference photo 468 as inputs, second neural network 466 outputs digital avatar images 470 for a digital avatar of the user associated with reference photo 468. In particular, second neural network 466 outputs a sequence of images that may be used to construct a digital avatar video feed.

While FIG. 4B shows one exemplary architecture for an animation module, it may be appreciated that in other embodiments, other architectures could also be used. In another embodiment, for example, components of initialization module 404 could interface directly with one of first neural network 462 or second neural network 466, to modify their outputs. In some embodiments, components of initialization module 404 could operate directly on one of animated facial data 464, reference photo 468, and/or digital avatar images 470.

FIGS. 5 and 6 illustrate two exemplary architectures for videoconferencing systems that utilize a digital avatar system. Referring first to FIG. 5, architecture 500 includes a first participant device 502, a server 504, and, and a second participant device 506. For purposes of illustration, only two participant devices are shown, however it may be appreciated that any number of participant devices could be included in an architecture. Moreover, it may be understood that the various devices and server are configured to communicate using one or more networks (not shown).

Each component of the architecture is further configured to store and run a video conferencing application. Specifically, first participant device 502 includes videoconferencing application 510, server 504 includes videoconferencing application 520, and second participant device 506 includes videoconferencing application 522. Moreover, both first participant device 502 and second participant device 506 are configured with a digital avatar system (first digital avatar system 512 and second digital avatar system 524, respectively).

In some embodiments, a digital avatar system may be integrated into a videoconferencing application. In other embodiments, a digital avatar system could run independently of the videoconferencing application and could pass captured and/or synthetic video streams with the videoconferencing application using suitable application programming interfaces (APIs).

In operation, each participant device runs a local version of the videoconferencing application. These applications then communicate with another version of the application running on server 504 to establish a videoconferencing session between (at least) the two participant devices. Each digital avatar system may be capable of running on the local device and initiating a digital avatar for the local user (i.e., the digital avatar system running on the first computing device can generate a digital avatar for the first participant) and/or for another user (i.e., the digital avatar system running on the first computing device can generate a digital avatar for the second participant).

Each digital avatar system may be initiated by one or more triggers. These triggers could be detected from one or more video feeds, from external inputs associated with the local device, or from external inputs associated with a remote device, or sensors in the environment of at least one participant.

The exemplary architecture provides the possibility of low-bandwidth operation, as follows. Digital avatars for one or more participants can be generated locally on each participant device. Instead of transmitting live video and audio for each user, the exemplary digital avatar system operates using only audio and/or text and (in some cases) a single image of the associated participant. Thus, in one operational mode, only audio and/or text is transmitted between all participant devices, and digital avatar systems residing on each participant device are used to automatically generate digital avatars for each participant. Alternatively, rather than generating digital avatars for all participants, the system could generate digital avatars for some participants, while continuing to display live video feeds for others.

It may be appreciated that in some other embodiments, a digital avatar system residing on one device (such as digital avatar system 512 on first participant device 502) could generate a digital avatar of any users and then send the digital avatar information to another device (such as second participant device 506) where it can be displayed. In such an operational mode, the bandwidth reduction may be limited as full video is still being transmitted, rather than only audio and/or text data (and possibly a few images). However, such an operational mode may be useful in some contexts where bandwidth is not a concern. For example, sending synthetic video of a participant using the exemplary system, rather than having a digital avatar generated for the participant at other devices, could allow the participant to enter the avatar mode without the knowledge of the other participants in the videoconferencing session, since only conventional video data is transferred.

FIG. 6 is a schematic view of another architecture 600 for a videoconferencing system that uses digital avatars. Referring to FIG. 6, architecture 600 includes a first participant device 602, a server 604, and a second participant device 606. Each device and server include a corresponding videoconferencing application (videoconferencing application 610, video conferencing application 620, and videoconferencing application 622). In the present architecture, digital avatar system 630 is stored and run on server 604. In this system, audio information from a participant device can be received and used (along with an image of the participant) to generate a digital avatar of the participant. The digital avatar video feed generated at server 604 can then be transmitted to other participant devices.

A benefit of architecture 600 is that the participants do not need to have components of the digital avatar system installed locally on their participant devices. Instead, the remote server, which can be provided with significant computational and memory resources, may handle the generation and control of the digital avatar (and associated synthetic video feed). This allows for a thin-client system where client devices of the avatar system do not require significant computational resources beyond what is required for basic video streaming.

In still another architecture (not shown), each participant device and each networked server could include a digital avatar system.

It may also be appreciated that in some cases, a digital avatar system may only be available on some participant devices that connected to a common videoconferencing session, but not other participant devices connected to the same session.

Any devices running a digital avatar system could include similar components to those discussed above for computing device 102 (see FIG. 1). In addition, any devices running a digital avatar system (such as a participant device or a server) could be configured to optimize performance for converting raw video and/or audio content to synthetic content using, for example, various kinds of neural networks. Therefore, such computing devices may be enabled with one or more parallel processing units (PPUs), such as graphics processing units (GPUs). In another embodiment, a system accelerates or otherwise improves inferencing performance of one or more neural networks using one or more PPUs, such as GPUs. In one embodiment, a system utilizes one or more PPUs, such as GPUs, for any other purpose related to services provided to one or more clients by said system. As one example, a GPU for neural network training and a processor for inference can be employed.

The embodiments provide systems and methods for activating digital avatars for one or more users in a videoconference (or other video streaming session) in response to various kind of triggers. Exemplary triggers that may be detected and used to initiate a digital avatar for a user include, but are not limited to camera performance/image quality, undesired objects or people present within the background of a participant's video feed, low battery conditions for one or more devices, signals from neighboring devices, indications that a participant is distracted or otherwise disengaged from a streaming video session, manual triggers from any participant (or from any participant devices) in a streaming video session, as well as other suitable triggers.

Figure 7:
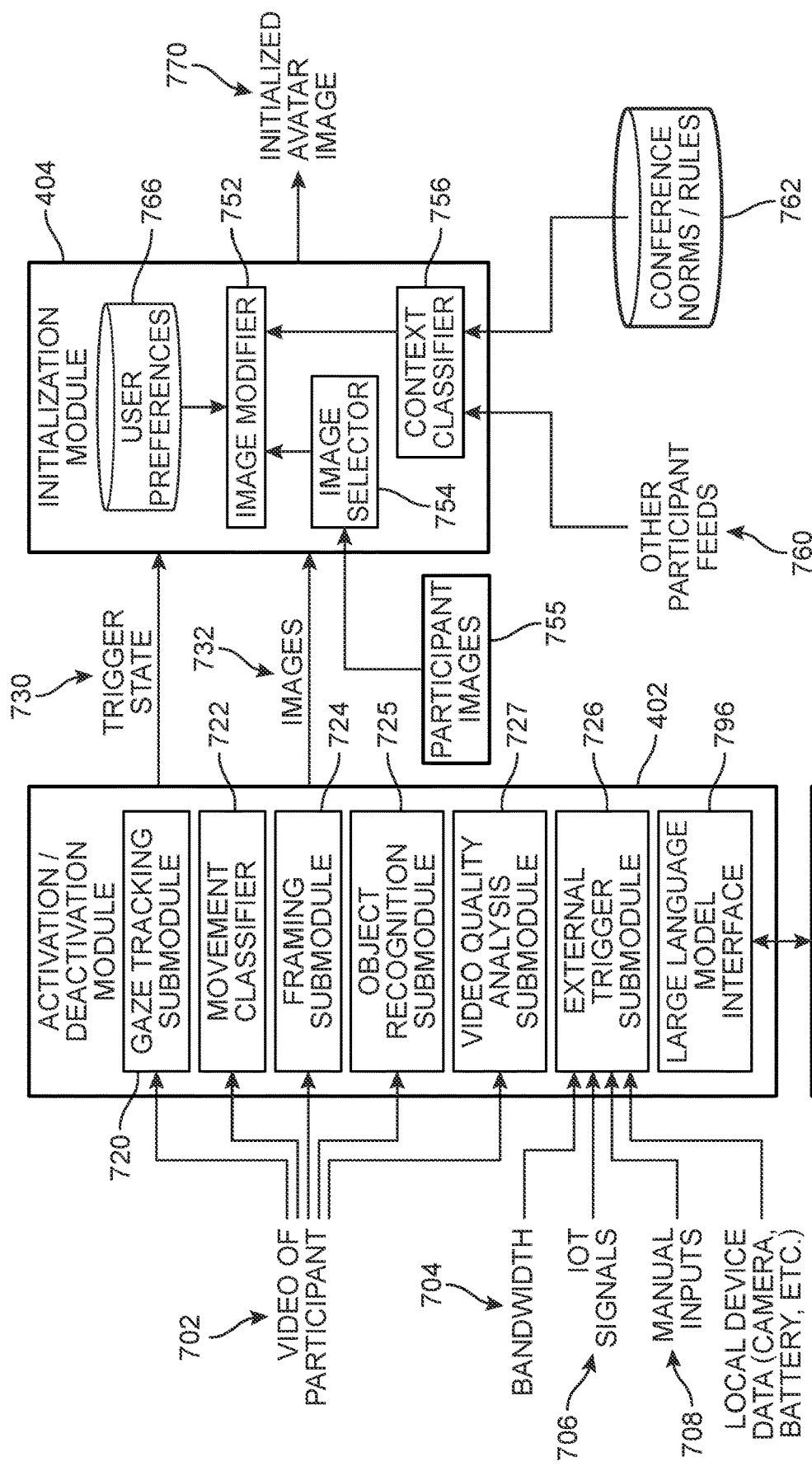
FIG. 7 is a schematic view of some components of a digital avatar system, according to an embodiment.

FIG. 7 is a schematic view of a process flow for an activation module and an initialization module of a digital avatar system, according to an embodiment. Recall that activation module 402 and initialization module 404 are components of digital avatar system 400 (see FIG. 4A). As seen in FIG. 7, captured video 702 of a participant may be received at activation module 402. Video of a participant ("video 702") may be analyzed by one or more submodules or other components to detect a triggering event indicating that a digital avatar should be activated for the participant. In the exemplary embodiment, video 702 may be analyzed using one or more of a gaze tracking submodule 720, a movement classifier 722, a framing submodule 724, an object recognition submodule 725, and a video quality analysis submodule 727.

Gaze tracking submodule 720 may analyze a participant's gaze or eye movements to determine if the participant appears to be distracted by a person or object located away from the camera or computing device. Any suitable gaze tracking algorithms, or similar computer vision techniques, could be used. In some embodiments, a gaze tracking algorithm can be programmed to trigger activation of a digital avatar when a participant's gaze falls outside of a range of parameters. These parameters could include a viewing angle (or window), and/or a time spent looking off screen. For example, in one embodiment a system could have a maximum time value such that if the participant's gaze is found to be directed away from the screen for more than the maximum time value, the activation/deactivation module triggers activation of a digital avatar to replace the live feed of the participant until the participant's gaze returns (in which case the avatar may be deactivated and the live feed resumed). This could be useful for switching to a digital avatar when a participant is distracted by a family member who has come into their home office, or when they are distracted by something in the room such as a pet, a television screen or something else.

Movement classifier 722 may be used to classify movements or motions that the participant makes based on analysis of captured video. Some motions, such as standing, walking, or turning away from a computing device/camera, may be trigger the activation of a digital avatar. Movement classifier 722 could comprise any suitable machine learning classifier that can detect and classify patterns in human movements. In some cases, movement classifier 722 may further include algorithms for object detection, object recognition, motion detection, and pose estimation. Suitable machine learning models that could be used to identify specific movements or activities include recurrent neural networks, long short-term memory networks, and convolutional neural networks. In some cases, if movement classifier 722 detects one of a set of predefined movements or activities, this may trigger activation of a digital avatar.

Framing submodule 724 may be used to detect whether a participant is sufficiently visible within a video frame. For example, if a participant's camera has been knocked over, or obscured, or if the participant has moved significantly to the left or right of their camera, the participant may not be visible to others in a videoconferencing session. In cases where the participant does not have a view of their own feed, they may be unaware of this situation. In such a situation, framing submodule 724 may analyze the captured video and determine that the participant is either out of the video frame or partially (or fully) obscured. This may trigger activation of a digital avatar.

Framing submodule 724 may utilize any suitable machine learning algorithms for identifying a participant within a video frame and determining if the participant is sufficiently visible. In some cases, framing submodule 724 may check the relative position of a participant within a frame to determine if the participant is partially, wholly, or not at all visible. In some cases, framing submodule 724 may use any suitable algorithms in computer vision, including known object detection and object recognition modules.

Object recognition submodule 725 may be used to detect any objects (including people) that are visible within a participant's video feed. Depending on the type of object detected, the system could trigger the digital avatar for the participant. For example, if a participant's young child wanders into the room and is visible on their video feed, object recognition submodule 725 may automatically detect the presence of the child and trigger the digital avatar system. This creates a digital avatar video feed, which in turn hides the presence of the child in the live video feed.

Object recognition submodule 725 may utilize any suitable machine learning algorithms in the field of computer vision for detecting objects (including people) within a participant's video feed. These could include, for example, convolutional neural networks (CNNs). In some cases, a system can include a list of predetermined objects, which when recognized, trigger the digital avatar mode. Such a list could include, for example, the detection of other people and pets.

The above types of triggers may be collectively referred to as a "triggering participant action," which refers to triggering events that may be initiated by the participant's behavior/actions and/or by something visible in the participant's environment. More specifically, such actions may generally be indirect triggers, as opposed to direct triggers, as when a participant may manually activate a digital avatar using some predefined input (such as pressing a particular key on a keyboard).

In contrast to the various kinds of triggering participant actions described above, a digital avatar system may be configured to receive other kinds of input to determine if a digital avatar should be activated. These inputs can be provided by other systems which the participant may or may not be aware of. For example, some inputs include bandwidth information 704, Internet of Things (IoT) device signals 706, manual inputs 708, and local device data 709.

Bandwidth information 704 may comprise information about the available bandwidth on a local area network, wide area network, or other suitable network. In some cases, bandwidth information could be provided by a participant device, a network router, or other suitable system. In some cases, bandwidth information 704 could include information about the bandwidth of other devices participating in a videoconferencing session. As used herein, the term "bandwidth information" may comprise any information about the transfer rate of information across any relevant networks. In some cases, bandwidth information can include relative or comparative information, such as information about how much available bandwidth a network has compared to its total possible bandwidth, or relative comparisons of bandwidth use across different devices on a network.

A digital avatar can be activated whenever one or more participant devices are experiencing sufficiently low bandwidth. As used herein, the term "sufficiently low bandwidth" refers to any measure of bandwidth that might be associated with video lag or other distortions in one or more video streams of a videoconferencing application. In some cases, this can be determined using a threshold bandwidth, or by analyzing one or more performance metrics/benchmarks that are influenced by bandwidth. In some cases, a "bandwidth threshold parameter" could be used for comparison, such that any bandwidth, or performance metric, below this parameter may trigger activation of a digital avatar for one or more participants. In other cases, bandwidth triggers can be detected indirectly, for example by monitoring video lag or performance directly, rather than data transfer rates. Thus, for example, if a videoconferencing application is experiencing significant lag with one or more streams, the system can interpret this as a triggering event related to low bandwidth.

IoT signals 706 may include any information provided by another networked device that can communicate with a participant device. As an example, an IoT doorbell is an electronic doorbell that can communicate with other devices over a local area network. In one embodiment, an IoT doorbell could transmit information to a participant device indicating that the participant's doorbell has been rung. Because it is likely that a participant may have to get up to answer the door, this signal may be treated as a trigger to activate a digital avatar. Other examples of IoT devices whose inputs could be monitored for triggering events include home alarm systems, home phone systems, cellular phones on a local network, smart televisions, smart appliances, or other suitable smart devices. As another example, if a digital avatar system receives a signal from a smart television that the volume of the smart television has been increased to a very high level, the system can automatically activate the digital avatar in case the participant needs to get up and turn down the television.

As another example, IoT signals 706 could include lighting information. In particular, activation/deactivation module 402 may receive signals from ambient light sensors, and/or directly from smart lights, to infer the lighting conditions within the participant's environment. If the system detects sufficiently low lighting conditions, it may automatically generate a digital avatar to avoid recording and sending low quality video to other participants. In other embodiments, rather than receiving ambient lighting information from external devices, a system could analyze captured video (using video quality analysis submodule 727) and infer lighting conditions directly from the captured video. In addition to detecting low light conditions, video quality analysis submodule 727 could be used to automatically detect blurring, poor contrast, or other image quality issues, and automatically trigger the digital avatar mode in response.

As another example of an IoT signal that could trigger a digital avatar mode, consider a situation in which a participant is on a videoconferencing call on their phone. Moreover, consider that the participant is walking around and enters a sensitive or restricted area or location (including geographic locations). For example, this could be a particular area in a government or corporate building where capturing images (or recording video) are not allowed. In this case, a remote system within the environment may generate a signal indicating that capturing video is prohibited at that location. Upon receiving this signal, the system could automatically activate a digital avatar mode. Because the digital avatar mode does not use any live video, the participant could continue with the videoconferencing session without capturing and transmitting any images of the sensitive area.

Alternatively, rather than receiving a signal from the remote system in the sensitive area, geofencing could be used to trigger the digital avatar mode. That is, the locations and conditions of sensitive areas could be determined a priori so that when a system detects the participant has entered a sensitive area (via a GPS receiver within the participant's device, for example), this could serve as a trigger to initiate the digital avatar system.

Manual inputs 708 could be any inputs that are initiated manually by a participant or other user of the videoconferencing system. In one embodiment, a manual input can be a keyboard input from a participant. The keyboard input may be used by the participant to signal that they need the digital avatar activated, because they are anticipating something distracting them from the videoconferencing session. Examples of distractions could include sneezing, coughing, laughing, or talking. In some cases, a system could be configured with a single input that may be initiated by a keystroke. In other cases, the system could be configured with different inputs, with each different input corresponding to different periods of time for which the participant needs the digital avatar to be active. For example, in some cases a participant could press the '2' key to indicate that they need a digital avatar to be generated for a couple of seconds. This would allow the user a chance to sneeze without that behavior being captured in their video feed. If the participant hits the '5' key, this could indicate that they need the digital avatar generated for five seconds. Entering 's' (for 'start') could indicate that the digital avatar should be started and maintained indefinitely, until the participant has indicated that the digital avatar can be deactivated (for example, by pressing the 's' key a second time). Inputs could be provided in a variety of different formats, including keystrokes, mouse clicks, by selecting buttons in a graphical user interface of the system, or using any other suitable inputs.

Local device data 709 could include various relevant information about the local device (that is, computing system). For example, local device data 709 could include information about the state of the device's camera (or any peripheral cameras plugged into the device). If the system cannot detect a signal from the camera, or if the camera has been deactivated, this information can be used as a trigger to create a digital avatar for the associated participant. As an example, if the system expects to receive video data from a computing device, but no video data is received, it may be assumed that there is a problem with the camera at the computing device. Other relevant local device data can include battery information. Because video processing may require significant computational resources and thus drain the battery more quickly, in some cases to save power, the system could use a low power (or low battery) condition of the local device as a trigger for a digital avatar system.

External signals and information (such as bandwidth information 704, IoT signals 706, and manual inputs 708) can be received by an external trigger submodule 726. External trigger submodule 726 may be pre-programmed with logic to interpret the various signals and information and to determine if, and for how long, a digital avatar should be generated and displayed in a participant's video feed.

As already mentioned, activation module 402 may also include provisions for deactivating a digital avatar. This could occur when activation module 402 receives triggering events that indicate that the digital avatar should be deactivated. Examples of triggering events for deactivating the digital avatar include expiration of a timer or detecting behaviors indicating that the participant is no longer distracted. For example, gaze tracking submodule 720, which may monitor captured video even while a digital avatar is displayed in a synthetic video feed, determines that a participant is now seated and looking at the camera/device, a new triggering event can be generated, indicating that the digital avatar can now be deactivated and the live feed resumed. Similarly, framing submodule 724, having previously generated a triggering event to activate the digital avatar in response to detecting that the participant was obscured within their live view, could determine that the participant is sufficiently visible again and generate a triggering event to deactivate the digital avatar.

It may be appreciated that both triggers to activate and/or deactivate a digital avatar could be received at the device where the avatar is generated, or at any other device participating the videoconferencing (or other streaming) session. Suppose, for example, that one participant's live video feed keeps glitching during a videoconferencing session. Any device running a digital avatar system could automatically, upon detecting issues with the received video quality (for example, using video quality analysis submodule 727) and/or bandwidth information from the glitching device, initiate a digital avatar mode for that participant, so that the participant's video feed is no longer glitching. In some cases, this can be done without informing that participant, to keep the videoconferencing session continuing smoothly.

The system can use one or more machine learning models—such as deep neural networks (DNNS)—to perform various tasks with respect to identifying triggering events. For example, a large language model (LLM) may use common sense reasoning or chain of thought prompting to determine when a triggering event is occurring. In such an example, a prompt may be generated based on system performance—e.g., bandwidth, latency, throughput, and/or frame rate.—and this prompt may be processed by the LLM to generate an output (e.g., an intent) indicating a triggering event has been realized. For example, where the bandwidth is below a threshold, the system may generate a message indicating a bandwidth level, that the threshold has been met, etc., and the LLM may process this to generate an output (or intent) that indicates a bandwidth trigger is to be generated, so that the system switches from an actual video display to an avatar display of the user. For example, the transcription of the meeting can be evaluated in real-time by an LLM to identify triggering events. For example, if the first participant (Jane) is talking with the second participant (Jack), and the first participant's communication break up, or your image goes out, the second participant may say "Hey, Jane, your image keeps cutting out" and the LLM can process this transcribed text and generate an indication of the trigger.

In an embodiment, as shown in FIG. 7, module 402 can further include a large language model interface 796 that communicates with a large language model 798. In some embodiments, any signals received by the system can be fed as input to large language model 798, via large language model interface 796. Large language model 798 may, depending on the data received, automatically determine that a triggering event is occurring. Moreover, large language model 798 may learn to identify various kinds of inputs that are indicative that a video feed of a user should be replaced with a digital avatar.

The outputs of activation module 402 may include a trigger state 730 as well as one or more images 732. Trigger state 730 may track whether a digital avatar mode has been triggered. In some cases, trigger state 730 could be TRUE if activation module 402 has detected a triggering event. When trigger state 730 is TRUE, initialization module 404 may be called to initialize the digital avatar. Alternatively, the trigger state could consist of three different values, corresponding to an ACTIVATE state, a DEACTIVATE state, and a CONTINUE state. Thus, activation/deactivation module 402 could set trigger state 730 to the ACTIVATE state whenever a digital avatar should be activated (if not yet activated). Likewise, the trigger state 730 could be set to the DEACTIVATE state whenever a digital avatar should be deactivated (if still active). The trigger state 730 may be set to the CONTINUE state whenever no triggering events have recently occurred, and the system should maintain the current live feed or the current digital avatar feed.

Images 732 may comprise one or more still images or frames from captured video of the participant. These images may be passed to an image selector 754. Image selector 754 is configured to select a suitable image for creating an initialized a digital avatar 770. As used herein, a "suitable image" for initializing a digital avatar may be any image that is sufficiently representative of a participant. Sufficiently representative can be determined according to clarity/focus of an image, how much of a participant has been captured within the image (i.e., just their face, or most of their face and body), and the orientation of the participant towards the camera. Once a suitable image has been selected, the image may be passed to image modifier 752.

In some embodiments, rather than using an image captured from a live video stream to build a digital avatar of a participant, image selector 754 could retrieve a previously stored image (participant images 755) from memory. In some cases, such images could be stored locally, while in other cases they could be retrieved from a remote server. In some embodiments, image selector 754 could do a real-time retrieval of a participant's image, for example, by querying an image search engine using known identifying for the participant. In some cases, videoconferencing applications may already have an image of the participant that is stored as part of their profile for that application. This could be useful, for example, when videoconferencing is done with participants who are not part of the same company or organization.

Initialization module 404 may also include a context classifier 756. Context classifier 756 is configured to analyze information from the videoconferencing environment (via other participant video feeds 760) as well as any known conferencing norms or rules 762.

Context classifier 756 may identify any contextual information that should be used by image modifier 752 to modify the selected image. As used herein, modifying an image may refer to editing an image or swapping out the image for another, related, image. For example, by analyzing images from other participants' feeds, context classifier 756 could determine that the attire for a videoconferencing session is formal. Specifically, context classifier 756 could analyze other participants' feeds and detect that multiple participants are wearing suits or similarly formal work attire. This contextual information can then be passed to image modifier 752. Based on this context information, image modifier 752 can modify images passed from image selector 754 so that the participant appears to be wearing formal attire, such as a suit, tie, or other formal attire, if the participant is not already wearing such attire. In cases where another picture of the user already wearing the suitable attire is available (for example, in the stored participant images 755), image selector 754 could use that image instead of the image passed from activation/deactivation module 402. Thus, context classifier 756 helps provide context for the initial image that will be used to initialize and eventually animate the digital avatar.

In one embodiment, a context classifier could automatically detect (using facial detection/recognition software) the presence of a high-level employee in a videoconferencing call. In such a situation, it may be preferable for the participant to appear in more formal attire. Therefore, based on the presence of this employee, the system could automatically modify the participant's appearance accordingly. As another example, a context classifier could interpret other participant feeds to extract information about what may or may not be culturally appropriate to wear in a given videoconferencing session.

Context classifier 756 may use any suitable algorithms for detecting context in one or more images. As an example, context classifier 756 could include a neural network to classify the "formality" of a videoconferencing session based on images of other participants. That is, the neural network could classify a session as "formal" or "informal," or using any other suitable categories. Based on the classified formality, the system could determine, using suitable rules, appropriate attire, as well as appropriate levels of grooming (i.e., shaving status). Context classifier 756 could be trained to interpret any other kinds of context in a video call that may be used to determine the appearance of a digital avatar Image modifier 752 may also receive user preferences 766. User preference 766 may be associated with a digital avatar profile for a participant. In contrast to contextual information, user preferences may include information about how a user may prefer to appear in a video stream, independent of the behaviors or appearances of other participants and/or independent of conferencing norms/rules. Preferences could include hair color, eye color, color or styles of clothing, makeup, and preferences about facial hair. In some cases, a user with many tattoos could have a preference for the system to automatically hide their tattoos. Any other suitable preferences could also be stored and retrieved by image modifier 752 during the process of generating an initialized avatar image. Based on these preferences, image modifier 752 could either generate a suitable reference image on the fly or retrieve a pre-stored image created by the participant, which renders the desired appearance (eye color, makeup, etc.).

Figure 8A:
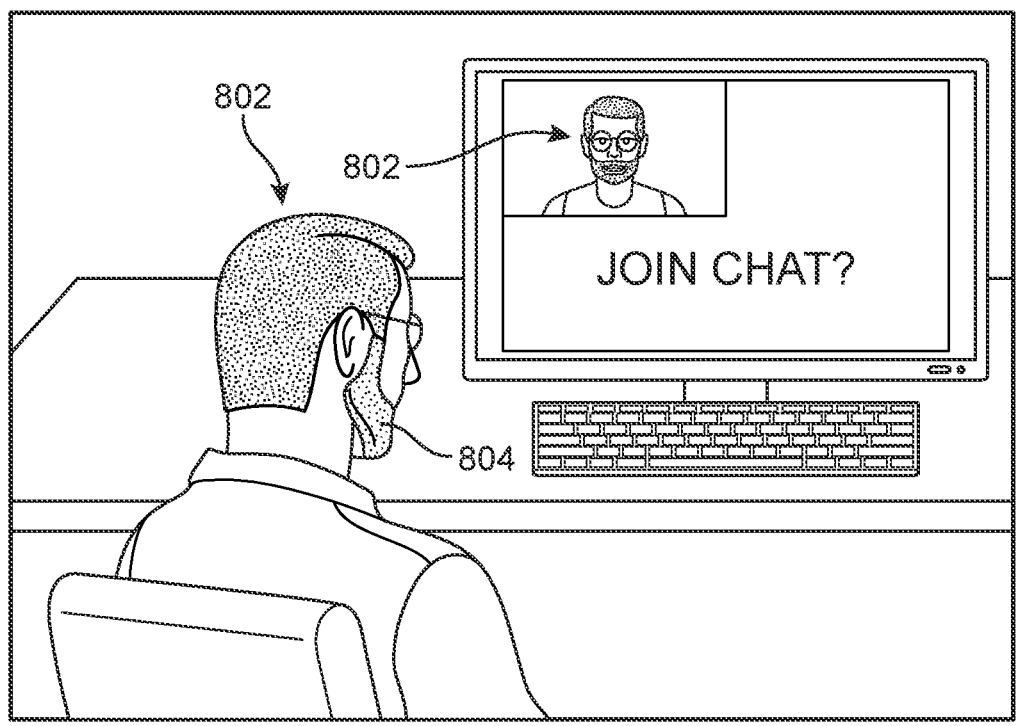
FIGS. 8A-B are schematic views of a situation where a digital avatar may be activated so that the visual appearance of a participant can be modified to meet appearance expectations for a meeting, according to an embodiment.
Figure 8B:
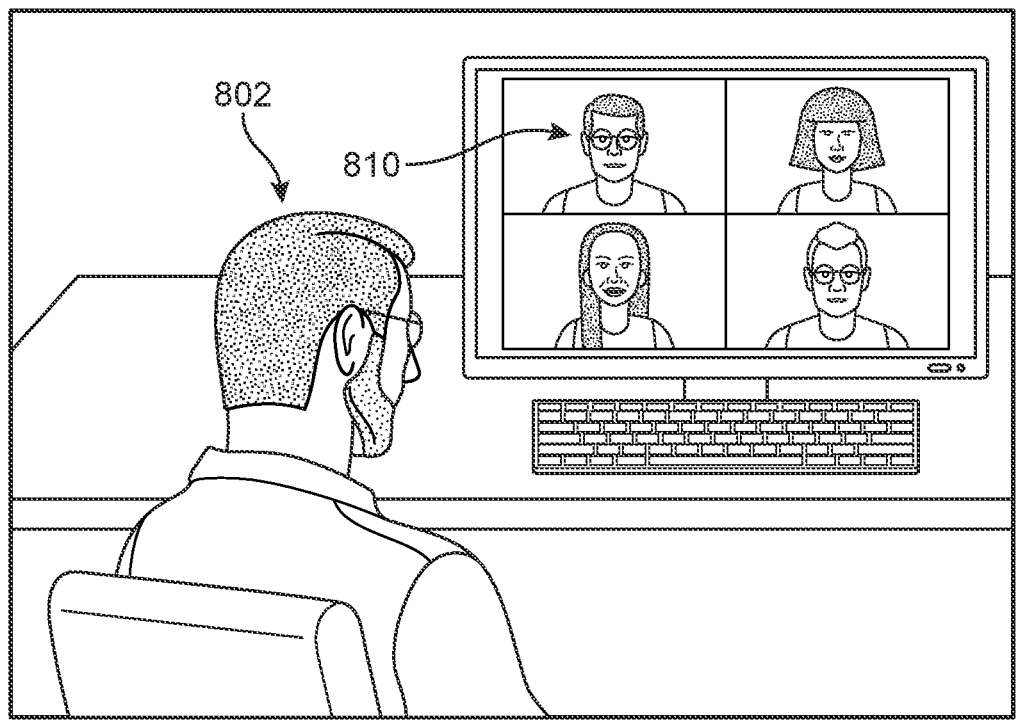

FIGS. 8A and 8B are schematic views showing how a participant's appearance can be altered by activating a digital avatar. In FIG. 8A, a participant 802 is preparing to join a videoconferencing session. Participant 802 has some facial hair 804 (a "five o'clock shadow"). In some cases, the exemplary digital avatar system can detect that participant 802 has a user preference to always appear clean shaven in a videoconferencing session. In this case, the exemplary digital avatar system could activate a digital avatar 810 of participant 802 that has a clean shaven appearance, as in FIG. 8B, as the participant is joining the current videoconferencing session. This may be accomplished by selecting a previously stored image of the participant in which the participant was clean shaven. Alternatively, image modifier 752 could be used to remove facial hair from any selected images, using suitable image processing algorithms.

In other cases, the exemplary digital avatar system can determine from contextual information that the tone of the videoconferencing session is formal, and upon detecting the participant has not shaved (using object detection/recognition to detect and identify the facial hair), automatically activate the digital avatar as in FIG. 8B. In still other cases, a formal rule or 'norm' stored by the system could require that all participants in a video are clean shaven, thereby triggering the digital avatars of any participants that are not clean shaven.

Figure 9:
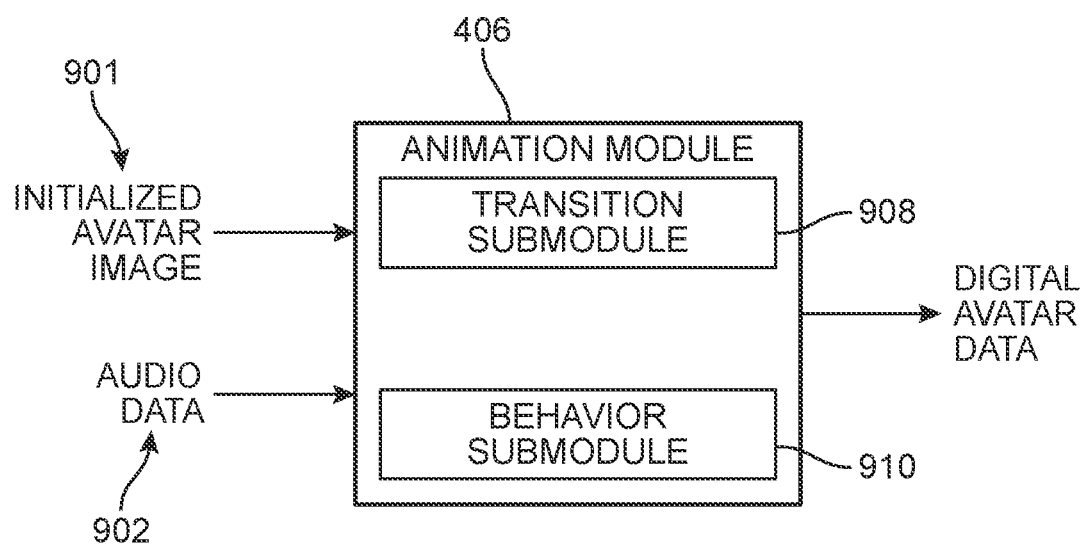
FIG. 9 is a schematic view of an animation module, according to an embodiment.

Referring to FIG. 9, an initialized avatar image 901, which is output by initialization module 404, may be provided to animation module 406, along with audio data 902. In some embodiments, the digital avatar is created as above, and simply swapped in for the previous live feed video of the participant. It may be appreciated, though, that such an abrupt transition could cause a distraction, as the participant may appear to jump to a different position within the video frame or to suddenly be looking in a different direction. To smooth such transitions, animation module 406 may include a transition submodule 908.

Figure 10:
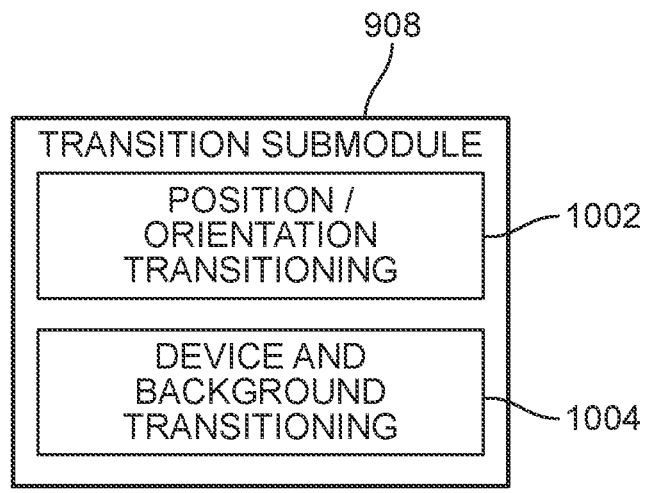
FIG. 10 is a schematic view of a transition submodule, according to an embodiment.

FIG. 10 is a schematic view of transition submodule 908 which can include one or more distinct transitioning features. In this example, transition submodule 908 includes a position/orientation transitioning feature 1002 and a device and background transitioning feature 1004. Position and orientation transitioning provides functionality that can identify a position and an orientation of a participant in the last live frame to be used and generate a suitably realistic transition from that position/orientation to a set position and orientation for a digital avatar. Here, a realistic transition may include initializing a digital avatar so that it matches the position and orientation of the participant within a video stream, and then animating the digital avatar to a set position, such as being seated and looking at the camera. When changing from an avatar mode back to a live mode, transition submodule 908 can also provide functionality for ensuring the digital avatar is located in a similar position and orientation as the participant just before the live feed is shown again. This ensures that there are no awkward jumps in the position/orientation of the participant as the system switches back and forth between the live mode and the avatar mode.

It may be appreciated that transition submodule 908 can leverage the GAN framework described above for animating a digital avatar between one position/orientation and another. In other cases, other suitable frameworks for animating static images between two different positions/orientations could be used to generate such transitions.

Device and background transitioning feature 1004 provides functionality for generating smooth transitions as a feed transitions from showing a participant and/or their digital avatar with different backgrounds and/or on different devices/platforms. For example, captured video from a participant's smartphone may look different from captured video from a participant's laptop. If the type of device used is different as the system transitions between live and synthetic feeds, the system can automatically attempt to correct and smoothly transition between changes in lighting, camera angle, image quality, image resolution, and even image size/orientation, that can occur. Likewise, the system can attempt to smoothly transition between distinct backgrounds, such as an outside environment and an indoor environment. These transitions could include using a common artificial background during the moment of transition or switching to a defocused background effect just before and after the transition between types of feeds.

It is also contemplated that transition submodule 908 could utilize conventional video scene transitions as the system switches between the live mode and the avatar mode. These scene transitions could include, but are not limited to, fading, screen swipes, blurred transitions, as well as other suitable transitions.

Embodiments can also include provisions for animating avatars in a realistic manner. This can include learning and implementing non-verbal behaviors that are suitable to the context of the videoconferencing session. Behaviors that may be identified, labeled, and then implemented within an animated digital avatar may include, but are not limited to: facial expressions (such as smiling, grinning, and frowning), body movements (such as standing, sitting, leaning forward, clapping, and nodding), as well as any other suitable behaviors that can be identified by the position, orientation, and/or other configuration of the body (and face) of a participant. Other nonlimiting examples of more complex behaviors include laughing, yawning, sneezing, coughing, eating, and drinking. Of course, behaviors could be categorized into further subcategories, so that there may be many distinct kinds of "eating" behaviors, for example.

As seen in FIG. 9, animation module 406 could also include a behavior submodule 910.

Figure 11:
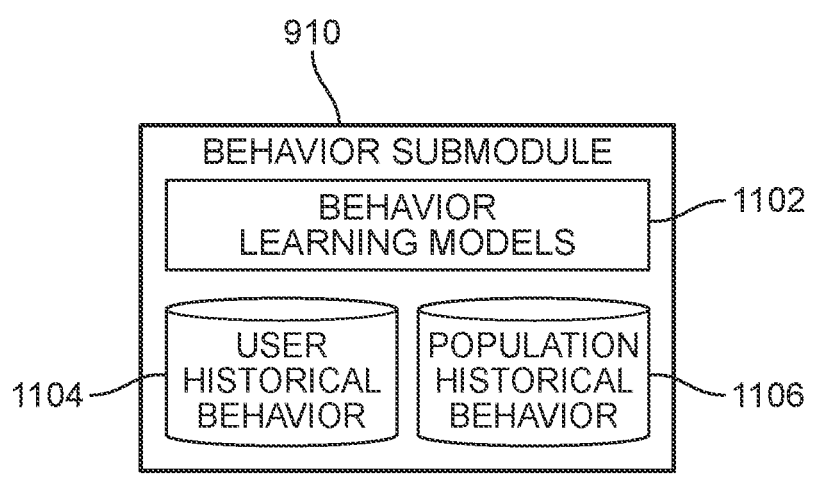
FIG. 11 is a schematic view of a behavior submodule, according to an embodiment.

FIG. 11 is a schematic view of behavior submodule 910. Behavior submodule 910 can include one or more behavior learning models 1102. Such models could include any suitable machine learning models for analyzing video images and identifying gestures, mannerisms, or other movements and classifying at least some of these as behaviors that can be replicated by a digital avatar. Exemplary models that could be used include LSTM models and other recurrent neural network models, which are capable of learning patterns in time.

Behavior submodule 910 can also include user historical behavior data 1104 and population historical behavior data 1106. User historical behavior data 1104 may include behaviors that have been learned by analyzing video for a particular user/participant. By contrast, population historical behavior data 1106 includes behaviors that have been learned from analyzing videos for multiple different participants. This data may be aggregated or averaged in some way to provide a database of "typical" or "common" behaviors.

Figure 12:
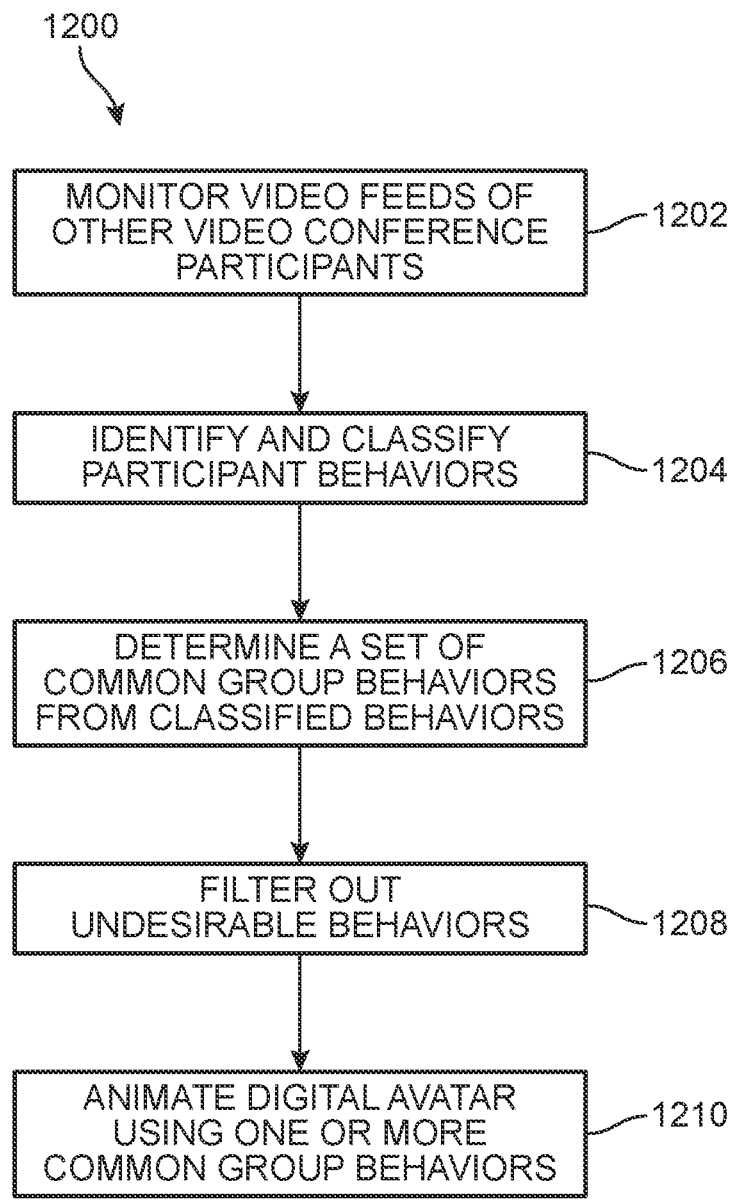
FIG. 12 is a schematic view of a process for identifying and implementing sets of behaviors in a digital avatar, according to an embodiment.
Figure 13:
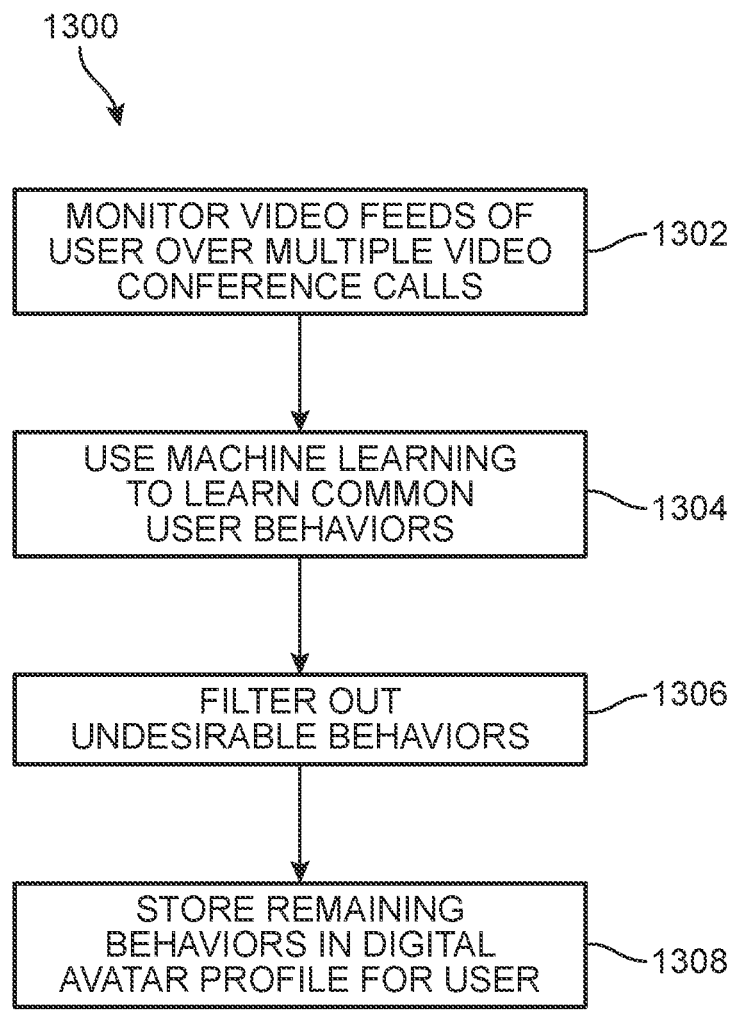
FIG. 13 is a schematic view of another process for identifying and implementing sets of behaviors in a digital avatar, according to an embodiment.

FIGS. 12 and 13 illustrate schematic views of processes for learning and using behaviors from groups or from particular participants, respectively. It may be appreciated that one or more operations of these processes could be carried out by behavior submodule 910.

Beginning with process 1200, in FIG. 12, a system can monitor the video feeds of other video conference participants in operation 1202. This monitoring can be done in real-time, during a conference, or after a conference has ended (using recordings of the conference). Next, the system could identify and classify participant behaviors, using suitable behavior models, in operation 1204. In operation 1206, the system could determine a set of common group behaviors from all classified behaviors. These common group behaviors could be selected according to behavior frequency, or other suitable metrics. In operation 1208, the system could filter out undesirable behaviors. In some cases, a system can include a list of undesirable behaviors, and may remove any identified common group behaviors that are included in the list of undesirable behaviors. As an example, a system could identify sneezing as a common group behavior based on video data gathered from multiple videoconferencing sessions. However, the system may be configured to filter out sneezing as an undesirable behavior. In operation 1210, the system could animate the digital avatar using one or more of the remaining (non-filtered) common group behaviors.

Process 1300 in FIG. 13 may be similar to process 1200. However, while process 1200 is used to learn about behaviors across a wide range of participants, process 1300 is directed to analyzing and learning behaviors from video streams for a single participant/user. Thus, while possibly requiring considerably more time to learn typical behaviors for a particular participant/user, this system may eventually be tuned to imitate a participant's specific gestures, mannerisms, and other movements with better accuracy, thereby helping to create a more realistic digital avatar.

In operation 1302, the system monitors video feeds of one particular participant (user) over multiple videoconferencing calls. In operation 1304, the system uses machine learning to identify common user behaviors during the videoconferencing calls. In operation 1306, the system can filter out undesirable behaviors, as discussed above. In operation 1308, the system can store remaining behaviors in a digital avatar profile associated to the participant/user. These stored behaviors can be used at a later time to animate a digital avatar for the participant/user.

For relatively new users of a digital avatar system, there may not be sufficient data for learning that user's typical behaviors. In such cases, it may be useful to default to using common group behaviors, which the system may have previously learned and stored, until enough time has passed for the user's typical behaviors to be learned.

Figure 14:
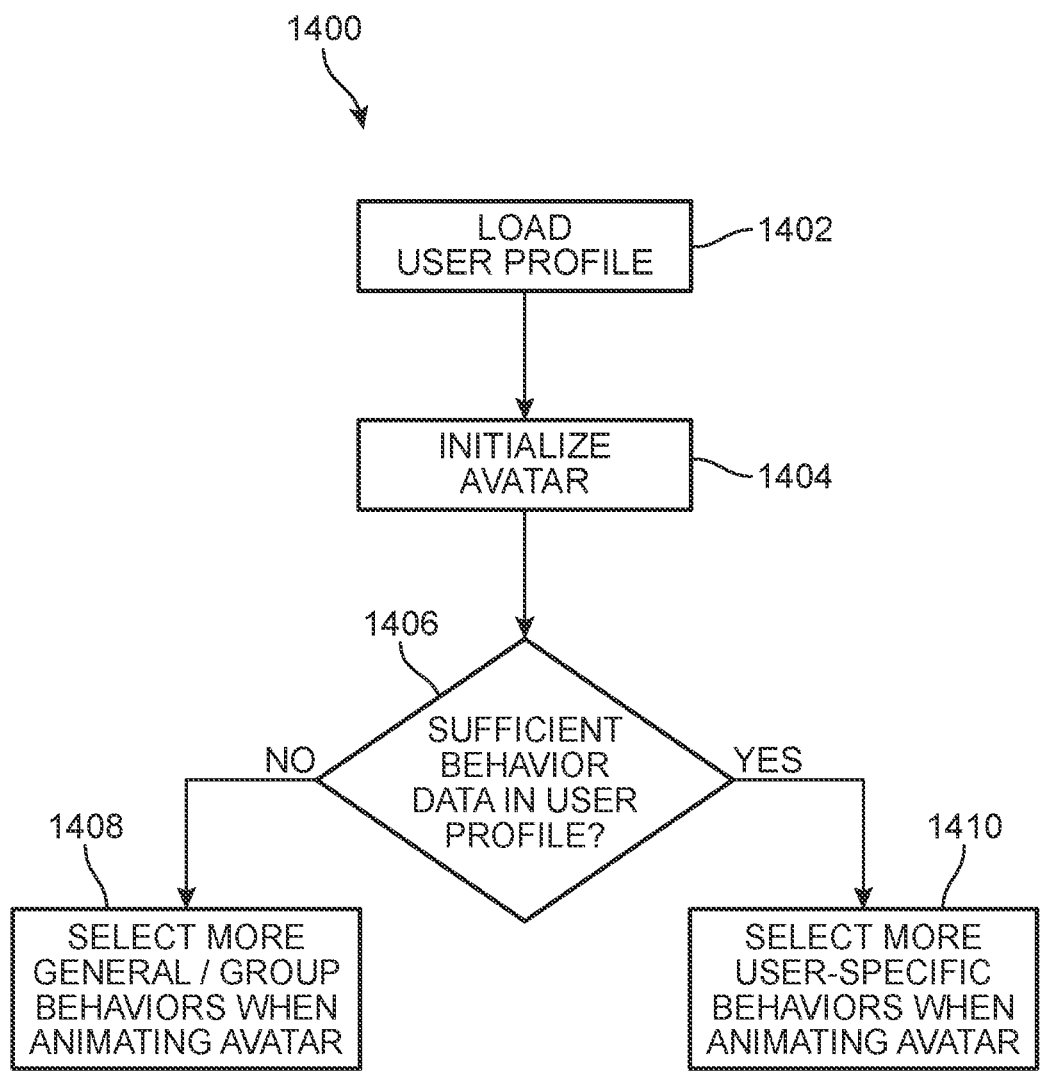
FIG. 14 is a schematic view of a process for determining which behaviors to use with a digital avatar from a set of possible behaviors, according to an embodiment.

FIG. 14 is a schematic view of a process 1400 for determining which sets of learned behaviors to use when animating a digital avatar. In operation 1402, the system loads a user profile (that is, a user's digital avatar profile). In operation 1404, the system initializes the avatar. In operation 1406, the system checks to see if there is sufficient behavior data specific to the user (that is, stored in the user profile). If so, the system proceeds to operation 1410 to select more user-specific behaviors when animating the avatar. If not, the system proceeds to operation 1408 to select more general group behaviors when animating the avatar. It may be appreciated that a system may not opt to only make use of user-specific behaviors or group behaviors. In some cases, a system could use some user-specific behaviors and some group behaviors while animating an avatar. However, process 1400 provides a method for determining if the mix of behaviors should lean towards more user-specific behaviors or towards common group behaviors.

In different embodiments, determining if there is sufficient behavior data in a user's profile may depend on the selection of some kind of threshold. For example, a threshold could be a minimum number of behaviors that should be present in a user profile if the system is set to default to using more user-specific behaviors. During operation 1406 of process 1400, the system could count the number of stored behaviors for the user and check it against the threshold or minimum number of behaviors.

Figure 15:
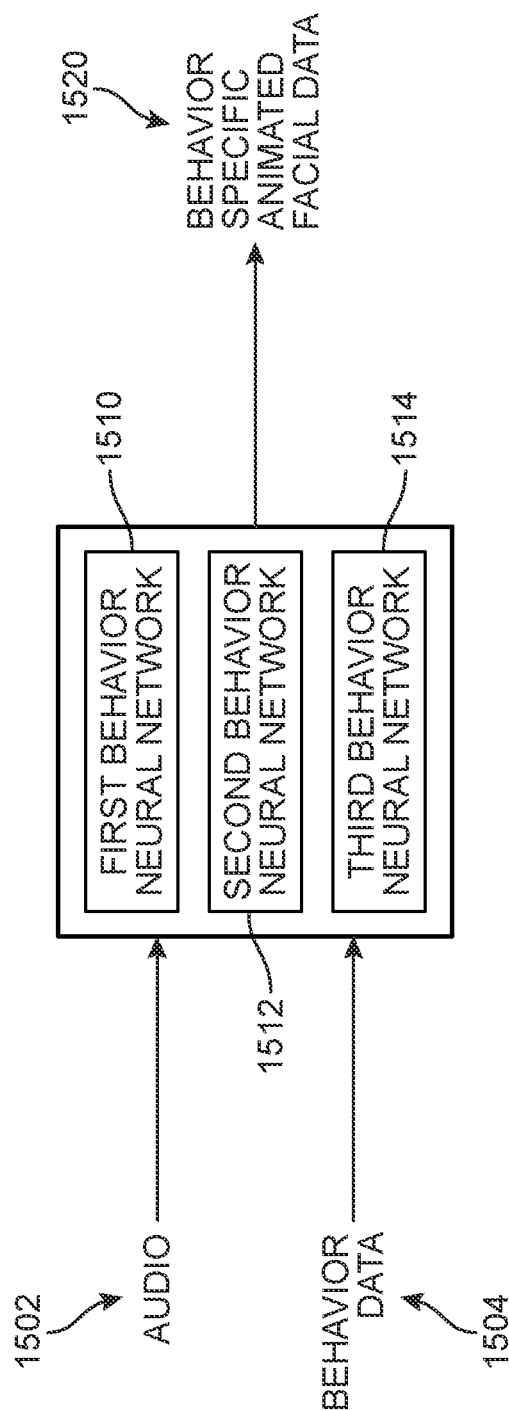
FIG. 15 is a schematic view of a framework for generating synthetic video of an avatar speaking and performing other gestures and movements, according to an embodiment.

FIG. 15 is a schematic overview of a framework for generating behavior specific animated facial data 1520. The behavior specific animated facial data encodes facial patterns for faces speaking particular words (or not speaking) while also enacting specified behaviors (such as smiling, grinning or frowning). In the present embodiment, rather than using a single neural network to generate animate facial data from audio data, the architecture utilizes a set of neural networks (including first behavior neural network 1510, second behavior neural network 1512, and third behavior neural network 1514). Each of these neural networks are specific to a particular behavior, such as smiling or frowning. The system is provided with audio data 1502 and behavior data 1504. In some cases, behavior data 1504 is associated with audio data 1502 as follows. Audio data 1502 is stored as time-stamped data, and behavior data 1504 includes annotations for one or more time stamps. Thus, if a user smiles at time 1:32 in the audio, behavior data 1504 includes a keyword for smiling and a reference to the specific timestamp.

Once received, the audio data 1502 is routed to the appropriate neural network according to behavior data 1504. For example, suppose the behavior data 1504 includes an annotation that the user should smile at a particular timestamp, during which time they are saying a particular sequence of words. In that case, that sequence of words is sent to the neural network associated with the behavior of smiling (such as first behavior neural network 1510) to generate animated facial data showing the user speaking the selected sequence of words while smiling. For each such sequence of words associated with a particular behavioral annotation, the system can use the appropriate neural network to generate the appropriate behavior specific animated facial data 1520.

While the embodiments depict a digital avatar as comprised of the head of a user, in other embodiments digital avatars could be full or partial body avatars that include a user's torso, arms, and/or legs, for example. Thus, the embodiments are not intended to be limited to systems and methods for triggering and initiating digital avatars of heads only. Instead, the same methods and systems described above could be used to trigger and initiate full or partial body digital avatars. In such embodiments, the technology utilized above for generating animated avatars from audio and a single image could also be applied to create full body avatars that can speak. Moreover, various motions of a user's body, including gestures and various mannerisms, could be created using suitably trained neural networks that can output suitable animations.

Although the embodiments describe using the disclosed systems and methods to generate synthetic videos with digital avatars during a live videoconferencing session or other live video stream, it may be appreciated that these same systems and methods can be used to generated synthetic video for previously recorded video. For example, a user making a video to be streamed online or made available for download at a later time could use the exemplary systems and methods to edit and modify the previously recorded video. This may provide a cost-efficient way to fix video mistakes as part of the post-production process, by using a digital avatar to fill in segments of video where a triggering participant action may be detected. For example, if the video shows a user describing a particular product that will be uploaded to a video sharing platform, the system can automatically "fix" moments when the user may have sneezed, coughed, moved out of frame, or otherwise performed some distracting or undesired behavior. In particular, the exemplary systems and methods can automatically identify the presence of such triggering events in previously recorded video and correct them by generating synthetic video with a digital avatar.

The embodiments may make use of any suitable kinds of neural networks for performing various functions and tasks as described above. Neural network can be any type of neural network usable to perform neural network operations further described herein. In some embodiments neural networks are trained using a training framework such as a generative adversarial network (GAN). In some embodiments, a deep neural network is trained using a training dataset and training framework such as a CUDA, PyTorch framework, TensorFlow, Boost, Caffe, Microsoft Cognitive Toolkit/CNTK, MXNet, Chainer, Keras, Deeplearning4j, or other training framework. In one embodiment, weights may be chosen randomly or by pre-training using a deep belief network. In another embodiment training may be performed in either a supervised, partially supervised, or unsupervised manner.

In one embodiment, an untrained neural network is trained using supervised learning, where a training dataset includes an input paired with a desired output for an input, or where training dataset includes input having a known output and an output of neural network is manually graded. In another embodiment untrained neural network is trained in a supervised manner and processes inputs from training dataset and compares resulting outputs against a set of expected or desired outputs. In one embodiment, errors are then propagated back through untrained neural network. In another embodiment training framework adjusts weights that control untrained neural network. In one embodiment, training framework includes tools to monitor how well the untrained neural network is converging towards a model, such as a trained neural network, suitable to generating correct answers, based on input data such as a new dataset. In another embodiment, a training framework trains an untrained neural network repeatedly while adjusting weights to refine an output of untrained neural network using a loss function and adjustment algorithm, such as stochastic gradient descent. In one embodiment, the training framework trains untrained neural network until the untrained neural network achieves a desired accuracy. In another embodiment the trained neural network can then be deployed to implement any number of machine learning operations.

In other embodiments, the untrained neural network is trained using unsupervised learning, where the untrained neural network attempts to train itself using unlabeled data. In one embodiment, an unsupervised learning training dataset will include input data without any associated output data or "ground truth" data. In another embodiment an untrained neural network can learn groupings within the training dataset and can determine how individual inputs are related to the untrained dataset. In one embodiment, unsupervised training can be used to generate a self-organizing map in the trained neural network capable of performing operations useful in reducing dimensionality of a new dataset. In another embodiment unsupervised training can also be used to perform anomaly detection, which allows identification of data points in the new dataset that deviate from normal patterns of the new dataset.

In another embodiment, semi-supervised learning may be used, which is a technique in which in the training dataset includes a mix of labeled and unlabeled data. In one embodiment, the training framework may be used to perform incremental learning, such as through transferred learning techniques. In another embodiment incremental learning enables a trained neural network to adapt to a new dataset without forgetting knowledge instilled within the trained neural network during initial training.

Media generated applying one or more of the techniques disclosed herein may be displayed on a monitor or other display device. In some embodiments, the display device may be coupled directly to the system or processor generating or rendering the images. In other embodiments, the display device may be coupled indirectly to the system or processor such as via a network. Examples of such networks include the Internet, mobile telecommunications networks, a WIFI network, as well as any other wired and/or wireless networking system. When the display device is indirectly coupled, the images generated by the system or processor may be streamed over the network to the display device. Such streaming allows, for example, video games or other applications, which render images, to be executed on a server or in a data center and the rendered images to be transmitted and displayed on one or more user devices (such as a computer, video game console, smartphone, other mobile device, etc.) that are physically separate from the server or data center. Hence, the techniques disclosed herein can be applied to enhance the images that are streamed and to enhance services that stream images such as NVIDIA® GeForce Now (GFN), and the like.

In addition, sound or other audio generated applying one or more of the techniques disclosed herein may be produced by a speaker or other audio output device. In some embodiments, the audio device may be coupled directly to the system or processor generating the sound. In other embodiments, the audio device may be coupled indirectly to the system or processor such as via a network. Examples of such networks include the Internet, mobile telecommunications networks, a WIFI network, as well as any other wired and/or wireless networking system. When the audio device is indirectly coupled, the sound generated by the system or processor may be streamed over the network to the display device. Such streaming allows applications and other software which include audio to be executed on a server or in a data center and the generated sound to be transmitted and produced by one or more user devices (such as a computer, smartwatch, smartphone, other mobile device, etc.) that are physically separate from the server or data center. Hence, the techniques disclosed herein can be applied to enhance the sounds that are streamed and to enhance services that provide audio.

User interfaces for APIs (application programming interfaces) can be used to facilitate an end user's interaction with, for example, a distributed computing environment (e.g., a web-based application), or an application residing wholly on a single computer system (e.g., a stand-alone application). In different embodiments, one or more of the computing devices can include a device display ("display") that can, for example, present information and media for a software application ("app"). In some embodiments, the app is associated with or is a platform providing the audio modification assistant service. In some cases, user devices may run client software through a web browser, in which case the client software may be hosted on a server associated with computer system. In other cases, user device may run client software in the form of a native software application that has been downloaded through a centralized marketplace (i.e., an "app store"). In some embodiments, the app can be otherwise downloaded to be accessible locally on the device. In some cases, while the client software that allows users to perform various tasks may be run on user device, some of the software data may be retrieved from and stored on databases associated with a remote server.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, smart watches, smart glasses, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present disclosure may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct disclosure as defined by the claims. Any feature or element of any embodiment may also be combined with features or elements from other disclosures to form another distinct disclosure as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

We claim:

1. A method comprising:
   causing a presentation, at a first computing device, of a first video feed and audio data of a participant in a video streaming session, wherein the first video feed and the audio data is provided using sensors connected to a second computing device;

detecting a triggering event;
responsive to the triggering event, generating a second video feed depicting a digital avatar corresponding to the participant by:
retrieving an image associated with the participant from the first video feed;
generating an initialized avatar image using the image;
processing the initialized avatar image and the audio data, the processing including an animation of the initialized avatar image that is synchronized with the audio data; and
causing a presentation, using the first computing device, of the second video feed.

2. The method according to claim 1, wherein detecting the triggering event includes using a Large Language Model.

3. The method according to claim 1, wherein retrieving the image associated with the participant is further comprised of selecting an image from a frame of the first video feed of the participant.

4. The method according to claim 1, wherein detecting the triggering event includes at least one of: detecting movement of the participant within the first video feed, determining and monitoring a relative position of the participant within a frame of the first video feed, detecting using object recognition, an object within the first video feed, and receiving a signal from an IoT device.

5. The method according to claim 1, wherein the animation of the second video feed includes a realistic rendering of the participant.

6. The method according to claim 1, wherein the method provides a seamless video feed of the participant in the video streaming session by dynamically switching between a recorded video feed of the participant and a synthetic video feed of the participant during the video streaming session.

7. The method according to claim 1, wherein
detecting, after causing the presentation of the second video feed, a second triggering event; and
responsive to the second triggering event, causing a presentation, using the first computing device, of the first video feed of the participant.

8. The method according to claim 1, wherein generating the second video feed further comprises:
generating animated facial data, using a first neural network, from the audio data; and
generating the second video feed, using a second neural network, from the animated facial data and from the selected image of the participant.

9. The method according to claim 1, wherein displaying the second video feed includes replacing the first video feed with the second video feed.

10. A method comprising:
receiving, at a first computing device, a first video feed and audio data of a participant in a video streaming session, wherein the first video feed is provided using sensors connected to a second computing device;
detecting a triggering event;
responsive to the triggering event, generating a second video feed depicting a digital avatar corresponding to the participant by:
retrieving an image associated with the participant from the first video feed;
generating an initialized avatar image using the image;
processing the initialized avatar image and the audio data, the processing including an animation of the initialized avatar image that is synchronized with the audio data; and
sending the second video feed to a third computing device.

11. The method according to claim 10, wherein detecting the triggering event includes using a Large Language Model.

12. The method according to claim 10, wherein retrieving the image associated with the participant is further comprised of selecting an image from a frame of the first video feed of the participant.

13. The method according to claim 10, wherein detecting the triggering event includes at least one of: detecting low lighting conditions in the first video feed, detecting a low battery condition for one of the first computing device or the second computing device, detecting that no video data is being received from the second computing device, and detecting a low bandwidth condition for the first computing device or the second computing device.

14. The method according to claim 10, wherein generating the second video feed further comprises:
generating animated facial data, using a first neural network, from the audio data; and
generating the digital avatar video, using a second neural network, from the animated facial data and from the selected image of the participant.

15. The method according to claim 10, wherein generating the second video feed further comprises:
retrieving a set of behavior data; and
processing the initialized avatar image using the set of behavior data.

16. The method according to claim 10, wherein the method provides a seamless video feed of the participant in the video streaming session by dynamically switching between a recorded video feed of the participant and a synthetic video feed of the participant during the video streaming session.

17. The method according to claim 10, wherein detecting the triggering event includes detecting that the participant is in a sensitive geographic location.

18. A system, comprising:
one or more processors to:
cause a presentation, at a first computing device, of a first video feed and audio data of a participant in a video streaming session, wherein the first video feed and the audio data is provided using sensors connected to a second computing device;
detect a triggering event;
responsive to the triggering event, generate a second video feed depicting a digital avatar corresponding to the participant by:
retrieving an image associated with the participant from the first video feed;
generating an initialized avatar image using the image;
processing the initialized avatar image and the audio data, the processing including an animation of the initialized avatar image that is synchronized with the audio data; and
cause a presentation, using the first computing device, of the second video feed.

19. The system according to claim 18, wherein the system provides a seamless video feed of the participant in the video streaming session by dynamically switching between a recorded video feed of the participant and a synthetic video feed of the participant during the video streaming session.

20. The system according to claim 18, wherein the one or more processors further:
select an image of the participant;
generate animated facial data, using a first neural network, from the audio data; and generate the second video feed, using a second neural network, from the animated facial data and from the selected image of the participant.

* * * * *